(12) United States Patent
Nagai et al.

(10) Patent No.: US 8,846,788 B2
(45) Date of Patent: Sep. 30, 2014

(54) POLYACETAL RESIN COMPOSITION, RESIN MOLDED ARTICLE, AND METHOD AND AGENT FOR IMPROVING POLYACETAL RESIN RAW MATERIAL COMPOSITION

(75) Inventors: Masayuki Nagai, Kanagawa (JP); Kunihiko Fujimoto, Kanagawa (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 24 days.

(21) Appl. No.: 13/061,854

(22) PCT Filed: Sep. 3, 2009

(86) PCT No.: PCT/JP2009/004351
§ 371 (c)(1),
(2), (4) Date: Jun. 1, 2011

(87) PCT Pub. No.: WO2010/026759
PCT Pub. Date: Mar. 11, 2010

(65) Prior Publication Data
US 2011/0230602 A1    Sep. 22, 2011

(30) Foreign Application Priority Data
Sep. 3, 2008  (JP) ................................. 2008-225461

(51) Int. Cl.
| C08K 5/34 | (2006.01) |
| C08K 5/3462 | (2006.01) |
| C08L 59/02 | (2006.01) |
| C08L 77/12 | (2006.01) |
| C09B 67/00 | (2006.01) |
| C09B 67/20 | (2006.01) |
| C08L 59/00 | (2006.01) |

(52) U.S. Cl.
CPC ............. *C08L 59/02* (2013.01); *C09B 67/0063* (2013.01); *C08L 59/00* (2013.01)
USPC .................. 524/88; 524/91; 524/99; 524/102; 524/192

(58) Field of Classification Search
USPC .................. 524/102, 88, 91, 99, 100, 192
See application file for complete search history.

(56) References Cited

U.S. PATENT DOCUMENTS

| 3,993,709 | A | 11/1976 | Hedrick et al. |
| 4,207,410 | A | 6/1980 | Burzin et al. |
| 4,230,838 | A | 10/1980 | Foy et al. |
| 4,349,661 | A | 9/1982 | Mumcu |
| 4,863,981 | A * | 9/1989 | Gugumus ....................... 524/97 |
| 6,306,940 | B1 | 10/2001 | Disch et al. |
| 2003/0162912 | A1 | 8/2003 | Disch et al. |
| 2003/0195280 | A1 | 10/2003 | Disch et al. |
| 2008/0287580 | A1 | 11/2008 | Disch et al. |
| 2009/0321466 | A1* | 12/2009 | Shannon ............................ 221/1 |

FOREIGN PATENT DOCUMENTS

| JP | 2712987 A | 10/1978 |
| JP | 2936976 A1 | 4/1981 |
| JP | 5-271516 A | 10/1993 |
| JP | 6-80619 A | 3/1994 |
| JP | 7-207118 A | 8/1995 |
| JP | 7-233307 A | 9/1995 |
| JP | 8-208946 A | 8/1996 |
| JP | 9-235447 A | 9/1997 |
| JP | 10-36630 A | 2/1998 |
| JP | 10-182928 A | 7/1998 |
| JP | 11-228691 A | 8/1999 |
| JP | 2000-34417 A | 2/2000 |
| JP | 2000-86738 A | 3/2000 |
| JP | 2001-81281 A | 3/2001 |
| JP | 2002-501098 A | 1/2002 |
| JP | 2002-146212 A | 5/2002 |
| JP | 2002-212384 A | 7/2002 |
| JP | 2003-113289 A | 4/2003 |
| JP | 2003-160710 A | 6/2003 |
| JP | 2003-220667 A | 8/2003 |
| JP | 2004-522810 A | 7/2004 |
| JP | 2005-220254 A | 8/2005 |
| JP | 2005-325225 A | 11/2005 |
| JP | 2006-232937 A | 9/2006 |
| JP | 2007-70575 A | 3/2007 |
| JP | 2007-145980 A | 6/2007 |
| WO | WO 2005/033200 A1 | 4/2005 |
| WO | WO 2005/033201 A1 | 4/2005 |

OTHER PUBLICATIONS

International Preliminary Report on Patentability (Form PCT/ISA/373 and PCT/ISA/237) in PCT/JP2009/004351 mailed Mar. 17, 2011.
Japanese Office Action dated Oct. 23, 2012 for Application No. 2009-202537.
Japanese Office Action dated Oct. 23, 2012 for Application No. 2009-202538.
International Search Report, dated Nov. 17, 2009, issued in corresponding International Application PCT/JP2009/004351.
Extended European Search Report dated Oct. 24, 2013 for European Application No. 09811289.9.

* cited by examiner

*Primary Examiner* — Kriellion Sanders
(74) *Attorney, Agent, or Firm* — Birch, Stewart, Kolasch & Birch, LLP

(57) ABSTRACT

A polyacetal resin composition containing 100 parts by weight of a polyacetal resin, 0.01 to 5 parts by weight of a colorant selected from inorganic and organic pigments, 0.01 to 3 parts by weight of a polyamide resin having a melting point or softening point of 180° C. or less, or a polyetheresteramide resin, 0.01 to 1 part by weight of an aromatic dihydrazide compound or an aliphatic dihydrazide compound having a solubility of less than 1 g relative to 100 g of water at 20° C., and 0.01 to 1 part by weight of a sterically hindered phenolic compound, or a combination of a hindered amine-based light stabilizer and an ultraviolet absorber, exhibits an excellent thermal stability and is capable of suppressing formaldehyde generation and mechanical strength deterioration.

28 Claims, 1 Drawing Sheet

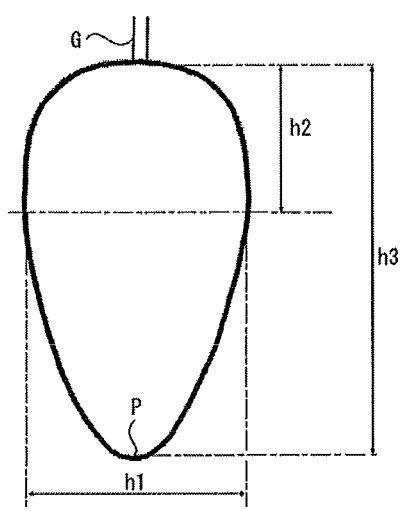

POLYACETAL RESIN COMPOSITION, RESIN MOLDED ARTICLE, AND METHOD AND AGENT FOR IMPROVING POLYACETAL RESIN RAW MATERIAL COMPOSITION

TECHNICAL FIELD

The present invention relates to a polyacetal resin composition and resin molded articles made thereof. In particular, it relates to a colored polyacetal resin composition having excellent thermal stability, suppressed formaldehyde generation and suppressed deterioration in mechanical strength, and molded articles made thereof. Furthermore, the invention also relates to a improving method and a improving agent of a polyacetal resin raw material composition.

BACKGROUND ART

Polyacetal resin is excellent in the balance of mechanical properties (such as friction resistance, abrasion resistance, creep resistance and dimensional stability), and has extremely excellent fatigue resistance. Furthermore, the resin is excellent in chemical resistance, too, and has a reduced water-absorbing property. Accordingly, while taking advantage of these characteristics, polyacetal resin is used as an engineering plastic for automobile interior parts, house interior parts (hot water mixing plugs, etc.), clothes parts (fasteners, belt buckles, etc.), building material uses (pipes, pump parts, etc.) and mechanical parts (gears, etc.) etc., and shows an increasing demand.

However, polyacetal resin is slightly thermally decomposed by thermal history in the production, molding etc. of the resin. As the result, although in a very minute amount, formaldehyde generates to thereby pollute the molding mold and deteriorate labor (health) environments in molding works. Furthermore, formaldehyde generating from resin products is considered to possibly cause sick house syndrome and the like.

In the circumstances, Ministry of Health, Labour and Welfare announces a guidance value for formaldehyde concentration (the upper limit 0.08 ppm) in building rooms, and thus farther reduction is required of the amount of formaldehyde generation from polyacetal resin molded articles.

It is well-known that the blending of an additive to polyacetal resin may suppress the formaldehyde generation from pellets and molded articles, and, conventionally, various materials have been examined as an additive. For example, there are proposed a melamine-formaldehyde polymer (Patent Document 1), a polyamine reaction product obtained by reacting a reaction product of polyamine and cyanuric chloride with ammonia or a derivative thereof (Patent Document 2), a dicyandiamide compound (Patent Document 3), a silane compound (Patent Document 4), a nitrogen-containing compound-borate (Patent Document 5), a glyoxydiureide compound (Patent Document 6), an urea derivative and/or amidine derivative (Patent Document 7), a condensate of phenols, a basic nitrogen-containing compound and aldehydes (Patent Document 8), a triazine ring-containing spiro compound (Patent Document 9), etc.

Moreover, there is proposed a method for suppressing the formaldehyde generation by producing polyacetal resin using a strong protonic acid such as trifluoromethane sulfonic acid as a catalyst (Patent Document 10). Furthermore, there is also proposed, as the adsorbent for formaldehyde, the use of an aliphatic dihydrazide compound such as an adipic acid dihydrazide or 1,2,3,4-butanetetracarboxylic acid hydrizide compound (Patent Document 11), and the combined use of these nitrogen-containing compounds with a metal salt of fatty acid (Patent Document 12).

For the coloring of polyacetal resin, generally, inorganic pigment or organic pigment is used. But the blending of these pigments tends to increase the formaldehyde generation from polyacetal resin pellets and molded articles thereof. Accordingly, for the polyacetal resin colored with pigment, the suppression of the formaldehyde generation is an extremely important problem.

RELATED ART DOCUMENT

Patent Documents

Patent Document 1: JP-A 5-271516
Patent Document 2: JP-A 7-207118
Patent Document 3: JP-A 8-208946
Patent Document 4: JP-A 9-235447
Patent Document 5: JP-A 10-36630
Patent Document 6: JP-A 10-182928
Patent Document 7: JP-A 2000-34417
Patent Document 8: JP-A 2002-212384
Patent Document 9: JP-A 2003-113289
Patent Document 10: JP-A 2000-86738
Patent Document 11: JP-A 6-80619
Patent Document 12: JP-T 2004-522810

SUMMARY OF THE INVENTION

Problems that the Invention is to Solve

As described above, various methods are examined for suppressing the formaldehyde generation from polyacetal resin, but a satisfactory method has not been found yet.

The blending of pigment deteriorates not only the thermal stability of the polyacetal resin but also the effect of suppressing the formaldehyde generation caused by another additive. Accordingly, in order to suppress the formaldehyde generation from a polyacetal resin colored with pigment, in conventional method, a large amount of additive is necessary to be added. However, as the result of the examination of the present inventor, it was known that the blending of an additive in a large amount caused such problems as the deterioration of mechanical properties of the resin, and the deterioration of molding properties due to mold pollution in the molding. Accordingly, a method is required that satisfies both the coloring of polyacetal resin with pigment, and the suppression of formaldehyde generation, the suppression of mechanical property deterioration and the improvement of molding properties.

A purpose of the invention is to provide a polyacetal resin composition that is colored by the blending of pigment, and, furthermore, is excellent in molding properties and has suppressed formaldehyde generation from pellets and molded articles and suppressed mechanical property deterioration of molded articles, and resin molded articles made thereof.

Means for Solving the Problems

The present inventors found that a material obtained by blending at least three kinds of specified additive components into a polyacetal resin colored with a pigment in common use is excellent in molding properties, has remarkably suppressed formaldehyde generation from pellets and resin molded articles and also suppressed mechanical property deterioration, thereby completing the present invention. Specifically, the above-mentioned purpose was attained by means below.

[1] A polyacetal resin composition comprising:
(A) 100 parts by weight of a polyacetal resin,
(B) 0.01 to 5 parts by weight of a colorant selected from inorganic and organic pigments,
(C) 0.01 to 3 parts by weight of (C1) below, or 0.01 to 3 parts by weight of (C2) below,
  (C1) a polyamide resin provided with at least one of such physical properties that the melting point or softening point is 180° C. or less, and the amine value is 2 mgKOH/g or more,
  (C2) a polyetheresteramide resin,
(D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and
(E) 0.01 to 1 part by weight of (E1) below, or a combination of 0.01 to 5 parts by weight of (E2) below and 0.01 to 5 parts by weight of (E3) below,
  (E1) a sterically hindered phenolic compound,
  (E2) a hindered amine-based light stabilizer having a structure represented by Formula (1) below,
  (E3) an ultraviolet absorber,

[Chem 1]

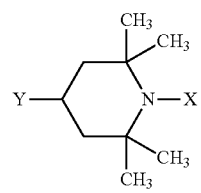

(1)

wherein X represents an organic group having a carbon atom at the bonding portion with the nitrogen atom, and Y represents an organic group that is bonded with a piperidyl group via an oxygen atom or a nitrogen atom, or a hydrogen atom.

[2] The polyacetal resin composition according to Item [1], comprising the polyamide resin (C1) provided with at least one of such physical properties that the melting point or softening point is 180° C. or less, and the amine value is 2 mgKOH/g or more, and the sterically hindered phenolic compound (E1).

[3] The polyacetal resin composition according to Item [1], comprising the polyamide resin (C1) provided with at least one of such physical properties that the melting point or softening point is 180° C. or less, and the amine value is 2 mgKOH/g or more, the hindered amine-based light stabilizer (E2) having a structure represented by the above-mentioned Formula (1), and the ultraviolet absorber (E3).

[4] The polyacetal resin composition according to Item [1], comprising the polyetheresteramide resin (C2), and the sterically hindered phenolic compound (E1).

[5] The polyacetal resin composition according to Item [1], comprising the polyetheresteramide resin (C2), the hindered amine-based light stabilizer (E2) having a structure represented by the above-mentioned Formula (1), and the ultraviolet absorber (E3).

[6] The polyacetal resin composition according to any one of Items [1] to [3], wherein the polyamide resin (C1) is a polyamide resin having a melting point or a softening point of 180° C. or less.

[7] The polyacetal resin composition according to any one of Items [1] to [3], wherein the polyamide resin (C1) has a melting point or a softening point of 180° C. or less, and an amine value of 2 mgKOH/g or more.

[8] The polyacetal resin composition according to any one of Items [1] to [3], [6] and [7], wherein the polyamide resin (C1) is one selected from the group consisting of polyamide 12, polyamide 6/66 copolymer, polyamide 6/12 copolymer, polyamide 6/66/610 terpolymer, polyamide 6/66/610/12 quaternary polymer and dimer acid polyamide resin.

[9] The polyacetal resin composition according to any one of Items [1] to [3], [6] and [7], wherein the polyamide resin (C1) is dimer acid polyamide resin.

[10] The polyacetal resin composition according to any one of Items [1], [4] and [5], wherein the amide portion of the polyetheresteramide resin (C2) is polyamide 12 or dimer acid polyamide resin.

[11] The polyacetal resin composition according to any one of Items [1], [4], [5] and [10], wherein the ether portion of the polyetheresteramide resin (C2) is polyoxyethylene glycol.

[12] The polyacetal resin composition according to any one of Items [1], [3] and [5], wherein, in the hindered amine-based light stabilizer (E2), X in the Formula (1) is a group selected from alkyl groups having 1 to 10 carbon atoms, and groups represented by Formula (2) or (3) below.

[Chem 2]

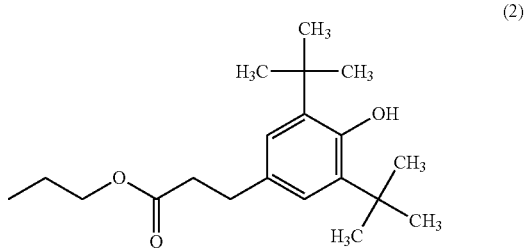

(2)

(3)

($m$ = 1~20)

[13] The polyacetal resin composition according to any one of Items [1], [3], [5] and [12], wherein the hindered amine-based light stabilizer (E2) is at least one selected from compounds represented by Formulae (4) to (12) below.

[Chem 3]
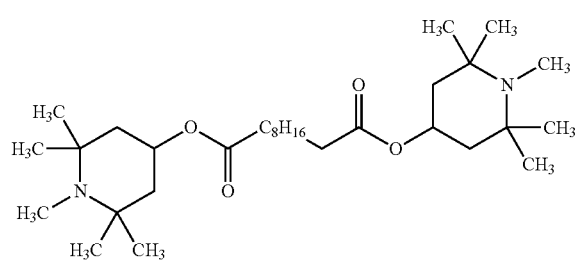
(4)
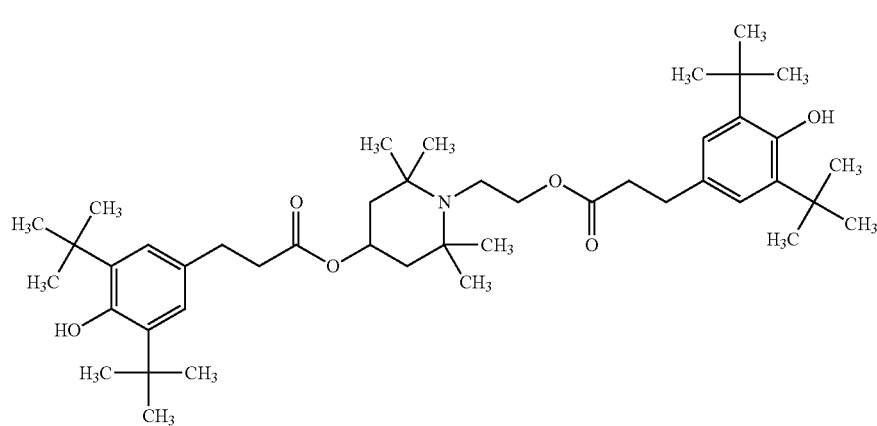
(5)
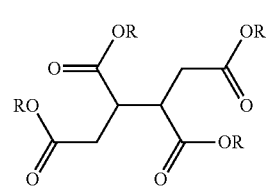
(6)
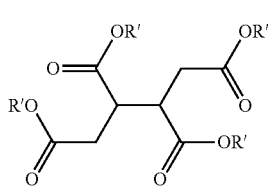
(7)
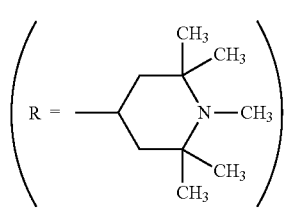
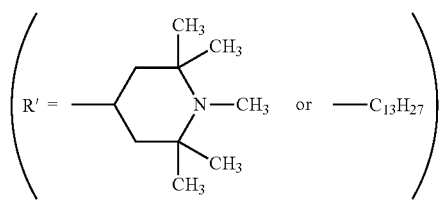
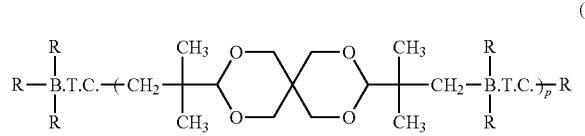
(8)
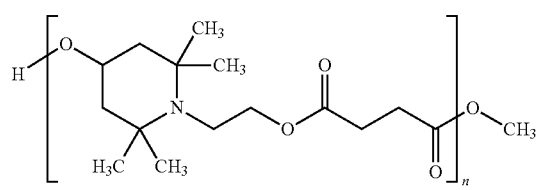
(9)
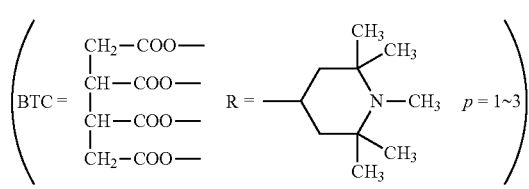

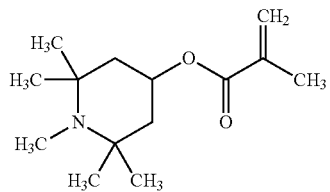

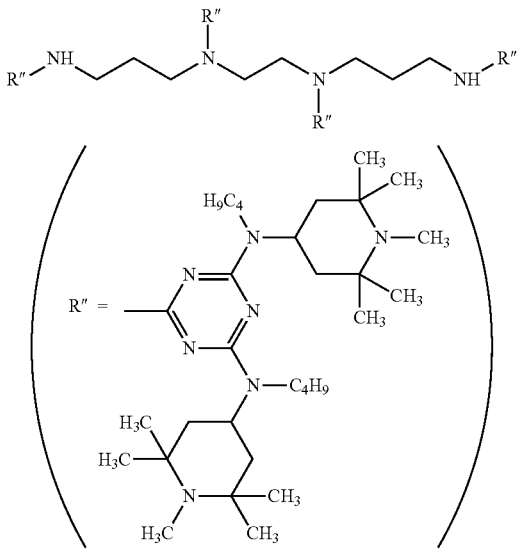

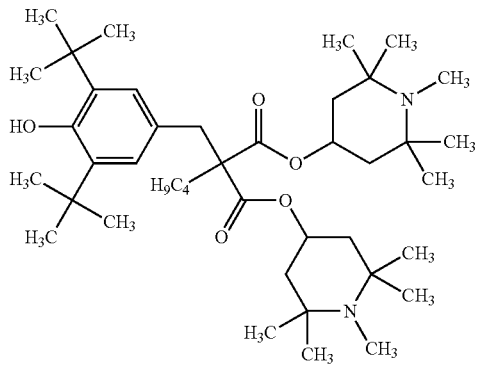

[14] The polyacetal resin composition according to any one of Items [1], [3] and [5], wherein the ultraviolet absorber (E3) is a benzotriazole-based compound.

[15] The polyacetal resin composition according to any one of Items [1], [3], [5] and [14], wherein the ultraviolet absorber (E3) has a vapor pressure of $1\times10^{-8}$ Pa or less at 20° C.

[16] The polyacetal resin composition according to any one of Items [1], [3], [5], [14] and [15], wherein the ultraviolet absorber (E3) is 2-(2H-benzotriazol-2-yl)-4,6-bis(1-methyl-1-phenylethyl)phenol or 2,2'-methylenebis[6-(2H-benzotriazol-2-yl)-4-(1,1,3,3-tetramethylbutyl)phenol].

[17] The polyacetal resin composition according to any one of Items [1] to [16], wherein the colorant (B) is one selected from the group consisting of titanium yellow, titanium white, perinone-based pigment, phthalocyanine-based pigment and carbon black.

[18] The polyacetal resin composition according to any one of Items [1] to [17], wherein the dihydrazide compound (D) is one selected from the group consisting of naphthalenedicarboxylic acid dihydrazide, terephthalic acid dihydrazide, isophthalic acid dihydrazide, sebacic acid dihydrazide and dodecane diacid dihydrazide.

[19] The polyacetal resin composition according to any one of Items [1] to [18], further comprising 0.01 to 10 parts by weight of an amino-substituted triazine compound (F), relative to 100 parts by weight of the polyacetal resin (A).

[20] The polyacetal resin composition according to any one of Items [1] to [19], having a tensile strength of 60 MPa or more.

[21] A polyacetal resin molded article formed by molding the polyacetal resin composition according to any one of Items [1] to [20].

[22] A method of improvement of a polyacetal resin raw material composition comprising mixing, in a polyacetal resin raw material composition comprising (A) 100 parts by weight of a polyacetal resin, the following components:

(B) 0.01 to 5 parts by weight of a colorant selected from inorganic and organic pigments, (C) 0.01 to 3 parts by weight of (C1) below, or 0.01 to 3 parts by weight of (C2) below, (C1) a polyamide resin provided with at least one of such physical properties that the melting point or softening point is 180° C. or less, and the amine value is 2 mgKOH/g or more, (C2) a polyetheresteramide resin, (D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and (E) 0.01 to 1 part by weight of (E1) below, or a combination of 0.01 to 5 parts by weight of (E2) below and 0.01 to 5 parts by weight of (E3) below, (E1) a sterically hindered phenolic compound,
(E2) a hindered amine-based light stabilizer having a structure represented by the above-mentioned Formula (1),
(E3) an ultraviolet absorber.

The limitations of Items [2] to [19] above can preferably be added to the improving method.

[23] The method of improvement according to Item [22], suppressing tensile strength deterioration and formaldehyde generation.

[24] The method of improvement according to Item [22] or [23], comprising adding the sterically hindered phenolic compound (E1).

[25] The method of improvement according to Item [22] or [23], comprising adding the hindered amine-based light stabilizer (E2) having a structure represented by Formula (1), and the ultraviolet absorber (E3), thereby improving the weather resistance.

[26] An improving agent for a polyacetal resin raw material composition comprising:
(B) 0.01 to 5 parts by weight of a colorant selected from inorganic and organic pigments,
(C) 0.01 to 3 parts by weight of (C1) below, or 0.01 to 3 parts by weight of (C2) below,
   (C1) a polyamide resin provided with at least one of such physical properties that the melting point or softening point is 180° C. or less, and the amine value is 2 mgKOH/g or more,
   (C2) a polyetheresteramide resin,
(D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and
(E) 0.01 to 1 part by weight of (E1) below, or a combination of 0.01 to 5 parts by weight of (E2) below and 0.01 to 5 parts by weight of (E3) below,
   (E1) a sterically hindered phenolic compound,
   (E2) a hindered amine-based light stabilizer having a structure represented by the above-mentioned Formula (1),
   (E3) an ultraviolet absorber.

The limitations of Items [2] to [19] above can preferably be added to the improving agent.

[27] The improving agent for a polyacetal resin raw material composition according to Item [26], suppressing tensile strength deterioration and formaldehyde generation.

[28] The improving agent for a polyacetal resin raw material composition according to Item [26] or [27], comprising the sterically hindered phenolic compound (E1).

[29] The improving agent for a polyacetal resin raw material composition according to Item [26] or [27], comprising the hindered amine-based light stabilizer (E2) having a structure represented by the above-mentioned Formula (1), and the ultraviolet absorber (E3), thereby improving the weather resistance.

Advantage of the Invention

The polyacetal resin composition of the invention has an excellent thermal stability, and is capable of suppressing formaldehyde generation and mold pollution in the molding, and, therefore, it not only improves the work environment but also causes a small amount of formaldehyde generation from molded articles and a little mechanical strength deterioration of molded articles. Accordingly, as a measure for so-called sick house syndrome, it can favorably used for automobile interior parts, house interior parts (hot water mixing plugs, etc.), clothes parts (fasteners, belt buckles, etc.), building material uses (pipes, pump parts, etc.) and mechanical parts (gears, etc.) etc.

BRIEF DESCRIPTION OF THE DRAWING

FIG. 1 is a schematic view of a droplet type mold used in the evaluation of a mold-polluting property of Examples of the present application. In the drawing, G is a gate, and P is a pointed extremity.

MODE FOR CARRYING OUT THE INVENTION

Hereinafter, the content of the present invention will be explained in detail. The explanation of constitutional conditions described below may be based on a typical embodiment or a specific example of the present invention, but the invention is not limited to such embodiment or specific example. In Description of the application, "to" is used within the meaning that numerical values described before and after thereof are included as the lower and upper limits, respectively.

(A) Polyacetal Resin

The polyacetal resin used in the invention is a polymer having the repetition of an acetal structure represented by —(—O—CRH—)$_n$— (wherein R represents a hydrogen atom, or an organic group), and, usually, has an oxymethylene group (—CH$_2$O—) containing a hydrogen atom as R, as a principal constitutional unit. In addition to homopolymer composed of the oxymethylene unit alone, the polyacetal resin used in the invention may be copolymer (block copolymer), terpolymer, etc. containing a constitutional unit other than the oxymethylene unit, and, furthermore, may have a branched or crosslinking structure, not only a linear structure.

Examples of the constitutional units other than the oxymethylene unit include oxyalkylene groups that may be branched having 2 to 10 carbon atoms such as an oxyethylene group (—CH$_2$CH$_2$O—), an oxypropylene group (—CH$_2$CH$_2$CH$_2$O—), and an oxybutylene group (—CH$_2$CH$_2$CH$_2$CH$_2$O—). Among these, oxyalkylene groups that may be branched having 2 to 4 carbon atoms are preferable, and an oxyethylene group is particularly preferable. The content of the oxyalkylene group other than the oxymethylene group is usually 0.1 to 20% by weight in the polyacetal resin.

Several methods are known for producing polyacetal resin, and, in the invention, polyacetal resin produced by any method can be used. For example, as a method for producing a polyacetal resin having an oxymethylene group and an oxyalkylene group having 2 to 4 carbon atoms as constitutional units, it can be produced by copolymerizing a cyclic oligomer of an oxymethylene group such as trimer (trioxane) or tetramer (tetraoxane) of formaldehyde, and a cyclic oligomer containing an oxyalkylene group having 2 to 4 carbon atoms such as ethyleneoxide, 1,3-dioxolan, 1,3,6-trioxocane or 1,3-dioxepane. As the polyacetal resin, the use of a copolymer of a cyclic oligomer such as trioxane or tetraoxane, and ethyleneoxide or 1,3-dioxolan is preferable, and the use of a copolymer of trioxane and 1,3-dioxolan is particularly preferable. The polyacetal resin has a melt index (ASTM-D1238: 190° C., 2.16 Kg) of usually 1 to 100 g/10 min, and preferably 0.5 to 80 g/10 min.

(B) Colorant

As inorganic and organic pigments constituting colorant (B), general inorganic pigment and organic pigment described in "Ganryo Binran (Pigment Handbook) (edited by Nippon Ganryo Gijutsu Kyokai (Japan Association of Pigment Technology))" can be used. Some examples thereof include, as inorganic pigment, (complex) metal oxides containing titanium such as titanium oxide and titanium yellow, zinc oxide, iron oxide, carbon black, ultramarine blue, zinc sulfide, antimony trioxide, etc. Examples of organic pigment include phthalocyanine-based, anthraquinone-based, quinacridone-based, azo-based, isoindolinone-based, quinophthalone-based, perinone-based, perylene-based pigments, etc.

The content of the inorganic and organic pigments in the polyacetal resin composition of the invention is 0.01 to 5 parts by weight, relative to 100 parts by weight of polyacetal resin (A). The content of less than 0.01 parts by weight can not form color significantly. The content of the pigment is preferably 0.05 parts by weight or more, and more preferably 0.1 parts by weight or more. The upper limit of the content is 5 parts by weight. The content of 3 parts by weight or less is preferable, and 2 parts by weight or less is more preferable. By setting the pigment to be 5 parts by weight or less, the formaldehyde generation can be suppressed.

Meanwhile, when the pigment is blended, a dispersion aid or a spreading agent may be blended. Examples of the dispersion aids include amide wax, ester wax, olefin wax, etc., and examples of the spreading agents include liquid paraffin, etc. Furthermore, dye may be used in combination with pigment to thereby give an intended hue.

(C1) Polyamide Resin

In the invention, there is blended polyamide resin (C1) provided with at least one of such physical properties that the melting point or softening point is 180° C. or less, and the amine value is 2 mgKOH/g or more. The blending of such polyamide resin can effectively suppress the generation of formaldehyde.

As the polyamide resin (C1) having a melting point or softening point of 180° C. or less, any of aliphatic polyamide resin, alicyclic polyamide resin and aromatic polyamide resin can be used.

Moreover, the polyamide resin may be one constituted of one constitutional unit, or one constituted of plural constitutional units. Examples of the raw materials of the polyamide resin include ω-amino acid, preferably linear ω-amino acids having 6 to 12 carbon atoms, and lactams thereof; dicarboxylic acids such as adipic acid, sebacic acid, dodecanedicarboxylic acid, heptadecanedicarboxylic acid, isophthalic acid and terephthalic acid, and dimethyl esters thereof; and diamines such as hexamethylenediamine. In the case of a copolymerized polyamide composed of plural constitutional units, the copolymerization ratio, the copolymerization form (random copolymer, block copolymer, cross-linked polymer) etc, can arbitrarily be selected. In the invention, as the polyamide resin (C1), the use of polyamide 12, polyamide 6/12 copolymer, polyamide 6/66/610 copolymer, polyamide 6/66/610/12 copolymer, or the like is preferable.

The melting point or the softening point is preferably 175° C. or less, and more preferably 170° C. or less. The use of such polyamide resin causes the molten state of the polyamide resin at a temperature of the kneading with polyacetal resin, thereby giving such advantage that the dispersibility of the polyamide resin is more enhanced.

Meanwhile, the melting point in the invention is a temperature at the peak top of an endothermic peak observed by differential scanning calorimetry (DSC). The endothermic peak means an endothermic peak observed when a sample is once heated and molten to thereby eliminate the effect on crystallinity due to thermal history and then heated again. Specifically, in the case of polyamide 12, for example, it can be obtained by the method below. The temperature is raised from 30 to 210° C. at a rate of 10° C./min, held at 210° C. for 2 min, and then fallen to 50° C. at a rate of 20° C./min. Furthermore, the temperature is raised up to 210° C. at a rate of 10° C./min, and the melting point is obtained from the peak top of the endothermic peak observed when the temperature is raised. The maximum temperature when it is raised may appropriately adjusted corresponding to the expected melting point of the polyamide resin, and is selected, usually, within a range up to the melting point+50° C. That melting point is 180° C. or less means that the polyamide resin always has the melting point of 180° C. or less observed by DSC within the weight-average molecular weight range of from 500 to 100,000.

The softening point in the invention is a temperature measured according to JIS K2207.

In the invention, the polyamide resin (C1) having an amine value of 2 mgKOH/g or more is also preferable. Such polyamide resin that has many amino groups at the end has such effect as neutralizing acidity due to formic acid generated by the oxidation of formaldehyde to thereby suppressing the decomposition of the polyacetal resin. The amine value is preferably 2.5 mgKOH/g or more, more preferably 3 mgKOH/g or more, furthermore preferably 5 mgKOH/g or more, and particularly preferably 8 mgKOH/g or more. The amine value of 2 mgKOH/g or more causes the suppression of decomposition of the polyacetal resin to be exerted more effectively. Although no particular limitation is imposed on the upper limit of the amine value, the value is usually 100 mgKOH/g or less, and preferably 80 mgKOH/g or less. Meanwhile, the amine value is a value defined by the mass of potassium hydroxide (KOH) equivalent to perchloric acid necessary for neutralizing all basic components contained in a molecule per unit mass. The amine value is obtained, for example, by dissolving 1 g of a sample in m-cresol, which is titrated by potentiometric titration with a perchloric acid methanol solution and then converted to mg of KOH.

The blending of pigment to polyacetal resin tends to decompose easily the polyacetal resin, and to generate easily formaldehyde. The formaldehyde forms formic acid when it is oxidized, and the acidity due to the formic acid causes the decomposition of the polyacetal resin to be furthermore accelerated. In the invention, the blending of the polyamide resin having many amino groups at the end makes it possible to neutralize the acidity due to the formic acid generated by the oxidation of formaldehyde, to suppress the decomposition of the polyacetal resin, and, amazingly, to exert such effect that it does not hinder the formaldehyde capturing effect by (D) component.

The amine value of polyamide resin can be adjusted by polymerizing dicarboxylic acid and diamine while adjusting the preparation ratio, or by reacting the polyamide resin obtained by the polymerization with an end adjuster such as amine by heating. As the amines used as the end adjuster, those having 6 to 22 carbon atoms are preferable, including, for example, aliphatic primary amines such as hexylamine, octylamine, decylamine, laurylamine, myristylamine, palmitylamine, stearylamine and behenylamine.

Furthermore, the use of dimer acid is preferable, too. As well-known, the dimer acid is formed by dimerizing such unsaturated fatty acids as oleic acid, linolic acid or erucic acid, and one representative example thereof contains mainly dibasic acid having 36 carbon atoms and/or hydrogenated product thereof, and, in addition, a small amount of monobasic acid (monomer) having 18 carbon atoms and tribasic acid (trimer) having 54 carbon atoms. Dimer acid polyamide resin obtained by reacting dimer acid with diamine has a softening point of 180° C. or less, and can be used favorably.

The polyamide resin may have an arbitrary weight-average molecular weight, and has usually 500 to 100,000, and preferably 1,000 to 50,000. Meanwhile, the weight-average molecular weight means the value measured by gel permeation chromatography (GPC) measurement and then converted to that of polystyrene.

The polyamide resin (C1) in the invention is preferably a polyamide resin having a melting point or softening point of 180° C. or less and an amine value of 2 mgKOH/g or more.

The content of polyamide resin (C1) is 0.01 to 3 parts by weight, relative to 100 parts by weight of polyacetal resin (A). When two kinds or more thereof are used, the total amount thereof falls within the range. The content of less than 0.01 parts by weight exerts too low effect of reducing the amount of formaldehyde generation from molded articles. Inversely, the content exceeding 3 parts by weight deteriorates the mechanical strength of articles molded from the polyacetal resin composition. Preferably the content of the polyamide resin is usually 0.05 parts by weight or more, and particularly 0.1 parts by weight or more, relative to 100 parts by weight of the polyacetal resin. The upper limit thereof is preferably 2 parts by weight or less, and furthermore preferably 1 part by weight or less.

(C2) Polyetheresteramide Resin

In the invention, the polyetheresteramide resin (C2) is blended. The blending of such polyetheresteramide resin can effectively suppress the formaldehyde generation.

The polyetheresteramide resin (C2) is typically constituted, mainly, of a polyamide unit and a polyoxyalkylene glycol unit. Usually, it is constituted, mainly, of the polyamide unit 15 to 90% by weight and the polyoxyalkylene glycol unit 85 to 10% by weight. The polyetheresteramide resin (C2) used in the invention is preferably a segmented copolymer.

The polyamide unit constituting the polyetheresteramide resin (C2) is a polymer having an amide bond, and may be any of (1) a ring-opening polycondensate of lactam, (2) an aminocarboxylic acid polycondensate, and (3) a polycondensate of dicarboxylic acid and diamine. Examples of (1) lactam include caprolactam, enantholactam, laurolactam, undecanolactam, etc. Examples of (2) aminocarboxylic acid include ω-aminocaproic acid, ω-aminoenanthic acid, ω-aminocaprylic acid, ω-aminopengonoic, ω-aminocapric acid, 11-aminoundecanoic acid, 12-aminododecanoic acid etc. Examples of (3) dicarboxylic acid include adipic acid, azelaic acid, sebacic acid, undecanoic diacid, dodecane diacid, isophthalic acid, polymerized fatty acids, etc., and examples of the diamines include hexamethylenediamine, heptamethylenediamine, octamethylenediamine, decamethylenediamine, methaxylylenediamine, etc. The polyamide unit has a molecular weight of 300 to 15,000, and preferably 800 to 5,000. Meanwhile, above-mentioned compounds exemplified as an amide unit-forming monomer may be used in two or more kinds in combination. Preferable compounds as the polyamide unit include polyamide (polyamide 12) obtained by the ring-opening polycondensation of laurolactam, and a dimer acid polyamide mainly obtained from the polycondensation reaction of a polymerized fatty acid with a diamine. Meanwhile, the polymerized fatty acid means a polymer of an unsaturated fatty acid, or a polymer formed by the hydrogenation of the polymer to thereby lower the degree of unsaturation. As the polymerized fatty acid used in the invention, preferable are a dimer (dimer acid), for example, of a monobasic fatty acid having around 10 to 24 carbon atoms and one or more double bonds or triple bonds, and/or hydrogenated products thereof. Examples of the dimer acids include dimers of oleic acid, linolic acid, erucic acid, etc. One of typical products is one containing mainly a dibasic acid having 36 carbon atoms and/or hydrogenated product thereof, and, in addition, a small amount of a monobasic acid (monomer) having 18 carbon atoms and a tribasic acid (trimer) having 54 carbon atoms.

The polyoxyalkylene glycol unit constituting the polyetheresteramide resin (C2) is a unit that is constituted of an oxyalkylene unit having 2 to 4 carbon atoms and has a molecular weight 200 to 8,000, including, specifically, polyoxyethylene glycol, polyoxypropylene glycol, polyoxybutylene glycol, etc. Among these, polyoxyethylene glycol is preferable.

These polyetheresteramide resins and the production method thereof are already known. For example, there are a method of performing ring-opening polymerization of lactam using an anionic catalyst in the presence of a condensed polyester prepolymer constituted of a polyether and a dicarboxylic acid (U.S. Pat. No. 3,993,709), a method of heat-polymerizing lactam or ω-aminocarboxylic acid, dicarboxylic acid, and polyol (DE-A-2712987 and DE-A-2936976), a method of condensing a dicarboxylic acid amide having a carboxylic group at the end of the molecular chain, and a polyol using a titanate-based catalyst (U.S. Pat. No. 4,230,838), etc.

The melting point or softening point of the polyetheresteramide resin (C2) is preferably 175° C. or less, and more preferably 170° C. or less. The use of such polyetheresteramide resin causes the molten state of the polyetheresteramide resin at a temperature of the kneading with the polyacetal resin, to thereby cause such advantage as the improvement of dispersibility of the polyetheresteramide resin.

In the invention, a polyetheresteramide resin having an amine value of 2 mgKOH/g or more is preferable, too. Such polyetheresteramide resin that has many amino groups at the end has such effect as neutralizing acidity due to formic acid generated by the oxidation of formaldehyde to thereby suppressing the decomposition of the polyacetal resin. The amine value is preferably 2.5 mgKOH/g or more, more preferably 3 mgKOH/g or more, furthermore preferably 5 mgKOH/g or more, and particularly preferably 8 mgKOH/g or more. The amine value of 2 mgKOH/g or more causes the suppression of decomposition of the polyacetal resin to be exerted more effectively. Although no particular limitation is imposed on the upper limit of the amine value, the value is usually 100 mgKOH/g or less, and preferably 80 mgKOH/g or less. Meanwhile, the amine value is a value defined by the mass of potassium hydroxide (KOH) equivalent to perchloric acid necessary for neutralizing all basic components contained in a molecule per unit mass. The amine value is obtained, for example, by dissolving 1 g of a sample in m-cresol, which is titrated by potentiometric titration with a perchloric acid methanol solution to be then converted to mg of KOH.

The blending of pigment to polyacetal resin tends to decompose easily the polyacetal resin, and to generate easily formaldehyde. The formaldehyde forms formic acid when it is oxidized, and the acidity due to the formic acid causes the decomposition of the polyacetal resin to be furthermore accelerated. In the invention, the blending of the polyetheresteramide resin having many amino groups at the end makes it possible to neutralize the acidity due to the formic acid generated by the oxidation of formaldehyde, to suppress the decomposition of the polyacetal resin, and, amazingly, to exert such effect that it does not hinder the formaldehyde capturing effect by the component (D).

The amine value of polyetheresteramide resin can be adjusted by polymerizing reaction components while adjusting the preparation ratio, by reacting the polyamide unit constituting the polyetheresteramide resin with an end adjuster such as amine by heating, or by reacting the polyetheresteramide resin obtained by the polymerization with an end adjuster such as amine by heating. As the amines used as the end adjuster, those having 6 to 22 carbon atoms are preferable, including, for example, aliphatic primary amines such as hexylamine, octylamine, decylamine, laurylamine, myristylamine, palmitylamine, stearylamine and behenylamine.

As the polyetheresteramide resin (C2) preferably usable in the invention, there can be cited a polyetheresteramide resin having a high amine value produced by a method shown, for example, in JP-A 11-228691 etc. Furthermore, in the invention, as the polyetheresteramide resin (C2), a polyetheresteramide resin described in JP-A 2002-146212 can preferably be used, too.

The polyetheresteramide resin may have an arbitrary weight-average molecular weight, and has usually 500 to 100,000, and preferably 1,000 to 50,000. Meanwhile, the weight-average molecular weight means the value measured by gel permeation chromatography (GPC) measurement and then converted to that of polystyrene.

The content of the polyetheresteramide resin (C2) is 0.01 to 3 parts by weight, relative to 100 parts by weight of the polyacetal resin (A). When two kinds or more thereof are used, the total amount thereof falls within the range. The content of less than 0.01 parts by weight exerts too low effect of reducing the amount of formaldehyde generation from molded articles. Inversely, the content exceeding 3 parts by weight deteriorates the mechanical strength of articles molded from the polyacetal resin composition. Preferably the content of the polyetheresteramide resin is usually 0.05 parts by weight or more, and particularly 0.1 parts by weight or more, relative to 100 parts by weight of the polyacetal resin. The upper limit thereof is preferably 2 parts by weight or less, and furthermore preferably 1 part by weight or less.

(D) Dihydrazide Compound

As the dihydrazide compound (D), in the invention, a dihydrazide compound selected from the group consisting of aromatic dihydrazide compounds, and aliphatic dihydrazide compounds having a solubility of less than 1 g relative to 100 g of water at 20° C. is used.

The aromatic dihydrazide compound means a compound formed by the reaction of hydrazine with respective acid groups of an aromatic compound having two carboxylic acid groups or sulfonic acid groups. Examples thereof include isophthalic acid dihydrazide, terephthalic acid dihydrazide, 1,5-naphthalene dicarbohydrazide, 1,8-naphthalene dicarbohydrazide, 2,6-naphthalene dicarbohydrazide, 1,5-diphenyl carbonohydrazide, 2,4-tolyenedisulfonyl hydrazide, 4,4'-oxybisbenzenesulfonyl hydrazide etc.

Examples of the aliphatic dihydrazide compounds having a solubility of less than 1 g relative to 100 g of water at 20° C. (which may be referred to, hereinafter, as water solubility) include oxalic acid dihydrazide (water solubility 0.2 g or less), sebacic acid dihydrazide (the same 0.01 g or less), 1,12-dodecane dicarbohydrazide (the same 0.01 g or less), 1,18-octadecane dicarbohydrazide (the same 0.1 g or less), etc. Aliphatic dihydrazide compounds having the water solubility of 1 g or more exhibits an insufficient effect for suppressing the formaldehyde generation from the polyacetal resin composition.

Preferable examples among the dihydrazide compounds (D) include 2,6-naphthalene dicarbohydrazide, terephthalic acid dihydrazide, isophthalic acid dihydrazide, sebacic acid dihydrazide, 1,12-dodecane dicarbohydrazide, etc. Particularly, the use of sebacic acid dihydrazide, 1,12-dodecane dicarbohydrazide, terephthalic acid dihydrazide or the like is preferable. The content of the dihydrazide compound is 0.01 to 1 part by weight relative to 100 parts by weight of the polyacetal resin. When the content is less than 0.01 parts by weight, the effect of reducing the formaldehyde generation from molded articles is insufficient. Inversely, the content exceeding 1 part by weight causes the increase in matters adhering to the mold in injection molding not to allow the molding to be performed effectively. The content of the dihydrazide compound is preferably 0.03 to 0.3 parts by weight, and more preferably 0.05 to 0.15 parts by weight.

(E1) Sterically Hindered Phenolic Compound

The sterically hindered phenol (hindered phenol) compound (E1) means compounds having, in the molecule, at least one structure having substituents at the ortho sites relative to the phenolic hydroxyl group represented by Formula (13) below.

[Chem 4]

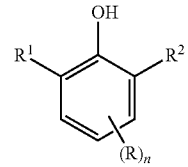

(13)

In Formula (13), $R^1$ and $R^2$ each independently represents a substituted or unsubstituted alkyl group. Moreover, the group may have an arbitrary substituent R at the metha site and/or the para site relative to the phenolic hydroxyl group. n is an integer of 0 to 3, and preferably 0 or 1.

Examples of the alkyl groups represented by $R^1$ or $R^2$ include groups having 1 to 6 carbon atoms such as a methyl group, an ethyl group, a propyl group, a butyl group and an amyl group. Among these, bulky branched alkyl groups such as a t-butyl group is preferable, and preferably at least one of $R^1$ and $R^2$ is such a branched alkyl group. As the substituent of the alkyl group, a halogen atom such as chlorine is cited.

As R, one having 4 or more carbon atoms is preferable. Moreover, the substituent R may be bonded with a carbon atom of the aromatic ring by a carbon-carbon bond, or via an atom other than a carbon.

Examples of the sterically hindered phenolic compound (E1) used in the invention include 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyldimethylamine, distearyl-3,5-di-t-butyl-4-hydroxybenzylphosphonate, diethyl-3,5-di-t-butyl-4-hydroxybenzylphosphonate, 2,6,7-trioxa-1-phospha-bicyclo[2,2,2]-oct-4-yl-methyl-3,5-di-t-butyl-4-hydroxyhydrocinnamate, 3,5-di-t-butyl-4-hydroxyphenyl-3,5-distearyl-thiotriazylamine, 2-(2-hydroxy-3,5-di-t-butylphenyl)-5-chlorobenzotriazol, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis (3,5-di-t-butyl-4-hydroxy-hydrocinnamamide), octadecyl-3-(3,5-di-t-butyl-4-hydroxyphenyl)propionate, 1,6-hexanediol-bis[3-(3,5-di-t-butyl-4-hydroxyphenyl) propionate], pentaerythritol-tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl) propionate], 2,2'-thiodiethyl-bis[3-(3,5-di-t-butyl-4-hydroxyphenyl)propionate], etc.

Among these, preferable compounds are those having a structure as represented by Formula (14) below such as N,N-hexamethylenebis(3,5-di-t-butyl-4-hydroxy-hydrocinnamide).

[Chem 5]

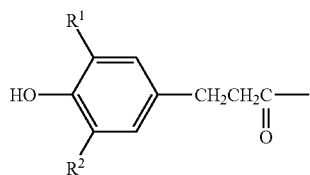

(14)

In Formula (14), $R^1$ and $R^2$ each has the same meaning as that in Formula (13), and has the same preferable range.

Moreover, esters of propionic acid having a 3,5-dialkyl-4-hydroxyphenyl group at the 3-site with polyhydric alcohol are also preferable, including 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], 2,2'-thiodiethyl-bis[3-(3,5-di-t-butyl-4-hydroxyphenyl)propionate] etc.

The content of the sterically hindered phenolic compound (E1) is 0.01 to 1 part by weight, relative to 100 parts by weight of the polyacetal resin (A). When the content is less than 0.01 parts by weight, the effect of suppressing thermal decomposition is low, and, as the result, the effect is small for suppressing the formaldehyde generation from molded articles. Inversely, when the content exceeds 1 part by weight, bleeding materials from the surface of molded articles become remarkable. The content is favorably 0.1 to 0.5 parts by weight. The incorporation of sterically hindered phenolic compound (E1) in the polyacetal resin composition of the invention can give an excellent thermal stability and moldability, and the effect of suppressing the formaldehyde generation, and, in addition, can suppress the deterioration of mechanical properties of pellets and molded articles. Of these, it can effectively suppress the deterioration of tensile strength.

(E2) Hindered Amine-Based Light Stabilizer

The hindered amine-based light stabilizer (E2) is an amine having a piperidine structure represented by the above-mentioned Formula (1). In Formula (1), X is an organic group bonded to a nitrogen atom of the piperidyl group by a carbon atom. Preferable X includes an alkyl group having 1 to 10 carbon atoms, and groups represented by the above-mentioned Formula (2) or (3). When X is an alkyl group, for example, a linear or branched chain alkyl group having 1 to 10 carbon atoms is cited, such as a methyl group, an ethyl group, a propyl group, a t-butyl group, a hexyl group, an octyl group or a decyl group, and a methyl group is particularly preferable. Moreover, (E2) hindered amine-based light stabilizer used in the invention can have plural piperidine structures in the molecule, wherein preferably all the piperidine structures have a N-carbon atom-2,2,6,6-tetramethyl-4-piperidyl structure.

Specific examples of preferable hindered amine-based light stabilizer (E2) include compounds below.

Above-mentioned Formula (4): bis(1,2,2,6,6-pentamethyl-4-piperidinyl)sebacate

Above-mentioned Formula (5): 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine Above-mentioned Formula (6): tetrakis(1,2,2,6,6-pentamethyl-4-piperidyl)-1,2,3,4-butanetetracarboxylate Above-mentioned Formula (7): 1,2,2,6,6-pentamethyl-4-piperidyl and tridecyl-1,2,3,4-butanetetracarboxylate (a mixture of compounds in which a part of four Rs of butanetetracarboxylate is 1,2,2,6,6-pentamethyl-4-piperidyl group and the others are tridecyl groups)

Above-mentioned Formula (8): a condensate of 1,2,3,4-butanetetracarboxylic acid, 1,2,2,6,6-pentamethyl-4-piperidinol and β,β,β,β-tetramethyl-3,9(2,4,8,10-tetraoxaspiro[5,5]undecane)-diethanol (p is 1 to 3)

Above-mentioned Formula (9): a condensate of dimethyl succinate and 4-hydroxy-2,2,6,6-tetramethyl-1-piperidineethanol (n is 10 to 14)

1,2,2,6,6-pentamethyl-4-piperidyl methacrylate shown by the above-mentioned Formula (10), Above-mentioned Formula (11): N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine Above-mentioned Formula (12): bis(1,2,2,6,6-pentamethyl-4-piperidyl)[[3,5-bis(1,1-dimethylethyl)-4-hydroxyphenyl]methyl]butylmalonate In the invention, the above-mentioned hindered amine compounds may be used singly or in two or more kinds in combination. Particularly preferable hindered amines among the above-mentioned ones are hindered amines represented by Formulae (5), (6), (7), (8), (9), (10) or (12).

The content of the hindered amine-based light stabilizer is 0.01 to 5 parts by weight, relative to 100 parts by weight of the polyacetal resin. The content of less than 0.01 parts by weight can not give sufficient weather resistance (effect of retarding the crack generation time). Inversely, the content exceeding 5 parts by weight remarkably deteriorates mechanical properties, and increases mold pollution, too. The content of the hindered amine-based light stabilizer is preferably 0.01 to 3 parts by weight, and more preferably 0.03 to 2 parts by weight.

(E3) Ultraviolet Absorber

The ultraviolet absorber (E3) used in the invention is a compound that has a function of absorbing ultraviolet rays. It is selected preferably from benzotriazole-based compounds, benzophenone-based compounds, aromatic banzoate-based compounds, cyanoacrylate-based compounds, and anilide oxalate-based ultraviolet absorbers.

Specific examples of the ultraviolet absorber (E3) include 2-(2'-hydroxy-5'-methyl-phenyl)benzotriazole, 2,2'-methylenebis[6-(2H-benzotriazol-2-yl)-4-(1,1,3,3-tetramethylbutyl)phenol], 2-(2H-benzotriazol-2-yl)-4,6-bis(1-methyl-1-phenylethyl)phenol, 2-(2'-hydroxy-3',5'-di-isoamyl-phenyl)benzotriazole, 2-[2'-hydroxy-3',5'-bis-(α,α-dimethylbenzyl)phenyl]benzotriazole, 2-(2'-hydroxy-4'-octoxyphenyl)benzotriazole, 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-oxybenzylbenzophenone, 2-hydroxy-4-methoxy-5-sulfobenzophenone, p-t-butylphenyl salicylate, p-octylphenyl salicylate, 2-ethylhexyl-2-cyano-3, 3'-diphenylacrylate, ethyl-2-cyano-3,3'-diphenylacrylate, N-(2-ethoxy-5-t-butylphenyl)oxalic acid diamide, N-(2-ethylphenyl)-N'-(2-ethoxyphenyl)oxalic acid diamide, etc.

These ultraviolet absorbers may be used singly, or in two or more kinds in combination. Preferable ultraviolet absorbers are benzotriazole-based compounds, and particularly preferable ones are benzotriazole-based ultraviolet absorbers having a vapor pressure of $1 \times 10^{-8}$ Pa or less at 20° C. Specific examples thereof include 2-(2H-benzotriazol-2-yl)-4,6-bis (1-methyl-1-phenylethyl)phenol and 2,2'-methylenebis[6-(2H-benzotriazol-2-yl)-4-(1,1,3,3-tetramethylbutyl)phenol].

The content of the ultraviolet absorber is 0.01 to 5 parts by weight, relative to 100 parts by weight of the polyacetal resin. The content of less than 0.01 parts by weight can not give sufficient weather resistance. Inversely, the content exceeding 5 parts by weight causes remarkable deterioration of mechanical properties. The content of the ultraviolet absorber is preferably 0.01 to 3 parts by weight, and more preferably 0.03 to 2 parts by weight. The incorporation of the hindered amine-based light stabilizer (E2) and the ultraviolet absorber (E3) in the polyacetal resin composition of the invention can give an excellent thermal stability and moldability and the effect of suppressing the formaldehyde generation, and, in addition, can improve the weather resistance of pellets and molded articles.

(F) Amino-Substituted Triazine Compound

The polyacetal resin composition of the invention is formed by blending the above-mentioned respective components (B) to (E) as indispensable components in a polyacetal resin, and, preferably, is blended furthermore with (F) amino-substituted triazine compound. The amino-substituted triazine compound includes amino-substituted triazines having the structure shown by Formula (15) below, or initial polycondensates of the same with formaldehyde.

[Chem 6]

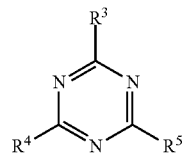

(15)

In Formula (15), $R^3$, $R^4$ and $R^5$ each independently represents a hydrogen atom, a halogen atom, a hydroxyl group, a mercapto group, an alkyl group having 1 to 10 carbon atoms, an aryl group having 6 to 12 carbon atoms that may be substituted by an alkyl group, a cycloalkyl group having 3 to 12 carbon atoms, or an amino group that may have been substituted, wherein at least one of $R^3$ to $R^5$ represents an amino group that may have been substituted.

Specific examples of the amino-substituted triazine compounds include guanamine, melamine, N-butylmelamine, N-butylmelamine, N-phenylmelamine, N,N-diphenylmelamine, N,N-diallylmelamine, N,N',N''-triphenylmelamine, N,N',N''-trimethylolmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, ameline(N,N,N',N'-tetracyanoethylbenzoguanamine), etc. These amino-substituted triazine compounds may be used as an initial polycondensate with formaldehyde (prepolymer). For example, the use of an initial polycondensate of melamine, methylolmelamine, benzoguanamine or the like with formaldehyde is preferable, and the use of water-soluble melamine-formaldehyde resin is particularly preferable.

The content of the amino-substituted triazine compound (F) when it is to be incorporated is preferably 0.01 to 10 parts by weight, more preferably 7 parts by weight or less, and particularly preferably 5 parts by weight or less, relative to 100 parts by weight of the polyacetal resin. A too much content may cause no good dispersion into the resin in the preparation of the resin composition and the aggregation in the polyacetal resin composition, thereby forming a so-called foreign material.

Other Components

To the polyacetal resin composition of the invention, a hydroxide, an inorganic salt, an alkoxide or the like of an alkali metal or an alkali earth metal may furthermore be blended. For example, a hydroxide, an inorganic acid salt such as a carbonate, a phosphate, a silicate or a borate, or an alkoxide such as a methoxide or an ethoxide of sodium, potassium, calcium, magnesium or the like, is blended. In particular, the blending of an alkali earth metal compound is preferable, and, among others, the blending of calcium hydroxide, magnesium hydroxide, calcium carbonate, or magnesium carbonate is preferable.

To the polyacetal resin composition of the invention, various known additives or fillers may be blended within a range that does not harm the purpose of the invention, in addition to the above-mentioned components. Examples of the additives include a lubricant, a mold-releasing agent, an antistatic agent, a flame retardant, etc., and examples of the fillers include a glass fiber, glass flake, glass bead, talc, mica, potassium titanate whisker, etc.

With regard to the content of components other than the above-mentioned (A) to (E) components in the polyacetal resin composition of the invention, when the component other than the (A) to (E) components is a flame retardant or a filler, 0 to 50 parts by weight is preferable, 5 to 40 parts by weight is more preferable, and 10 to 30 parts by weight is particularly preferable, relative to 100 parts by weight of the polyacetal resin. When the component other than the (A) to (E) components is a lubricant or a mold-releasing agent, 0 to 20 parts by weight is preferable, 0.05 to 10 parts by weight is more preferable, and 0.1 to 5 parts by weight is particularly preferable, relative to 100 parts by weight of the polyacetal resin. When the component other than the (A) to (E) components is an antistatic agent, 0 to 10 parts by weight is preferable, 0.05 to 5 parts by weight is more preferable, and 0.1 to 3 parts by weight is particularly preferable, relative to 100 parts by weight of the polyacetal resin.

Method for Producing Polyacetal Resin Composition

The method for producing the polyacetal resin composition of the invention is not particularly limited. The composition can be produced by mixing the (A) to (E) components and other components to be added if necessary in an arbitrary order, and kneading the mixture. Conditions such as temperature and pressure in the mixing and kneading may appropriately be selected in view of conventionally known methods for producing polyacetal resin compositions. For example, the kneading may be performed at a temperature higher than the melting point of the polyacetal resin, and, usually, it is preferably performed at 180° C. or more. As a production apparatus, too, mixing and kneading apparatuses conventionally known for producing such resin compositions may be used.

Specifically, for example, after blending simultaneously or in an arbitrary order, to the polyacetal resin (A), a predetermined amount of the colorant (B), the polyamide resin or the polyetheresteramide resin (C), the dihydrazide compound (D), and the sterically hindered phenolic compound or the combination of the hindered amine-based light stabilizer and the ultraviolet absorber (E), and, if desired, furthermore the amino-substituted triazine compound (F) and other additives etc., the blend is mixed with a tumbler type blender or the like. Subsequently, the obtained mixture is molten and kneaded by a single or twin screw extruder into a strand shape and then formed into pellets, thereby giving the polyacetal resin composition having an intended composition.

In addition, there is such alternative method as mixing, relative to the polyacetal resin (A), the polyamide resin or polyetheresteramide resin (C), the dihydrazide compound (D), the sterically hindered phenolic compound or the combination of the hindered amine-based light stabilizer and the ultraviolet absorber (E), and furthermore, if desired, the amino-substituted triazine compound (F), and then melting and kneading the mixture to thereby give pellets. To the pellet, the colorant (B) selected from inorganic and organic pigments is added, and then the mixture is mixed, molten and kneaded again to give pellets. Thus, the polyacetal resin composition having an intended hue can be obtained, too.

The polyacetal resin composition of the invention thus obtained has a high weather resistance, and, furthermore, can attain a mechanical strength, for example, a tensile strength of 60 MPa or more, preferably 62 MPa or more measured according to ISO 527 standard, shows a small amount of formaldehyde generation and mold pollution, and is excellent in the balance of these performances as compared with conventional polyacetal resin compositions.

Method for Improving Polyacetal Resin Raw Material Composition

The method for improving the polyacetal resin raw material composition of the invention is a method for improving a polyacetal resin raw material composition containing a polyacetal resin. In particular, it is a method for improving a polyacetal resin raw material composition so as to color the polyacetal resin raw material composition, and to suppress the tensile strength deterioration and the formaldehyde generation of molded articles. Moreover, it is a method for improving a polyacetal resin raw material composition so as to improve the weather resistance. In the invention, the composition containing a polyacetal resin, which is the object to be improved, is especially referred to as the polyacetal resin raw material composition.

The improving method of the invention is characterized by mixing 100 parts by weight of the polyacetal resin (A) contained in the polyacetal resin raw material composition, 0.01 to 5 parts by weight of the colorant (B) selected from inorganic and organic pigments, 0.01 to 3 parts by weight of polyamide resin (C) provided with at least one of such physical properties that the melting point or softening point is 180° C. or less, and the amine value is 2 mgKOH/g or more, or polyetheresteramide resin, 0.01 to 1 part by weight of the dihydrazide compound (D) selected from the group consisting of aromatic dihydrazide compounds, and aliphatic dihydrazide compounds having a solubility of less than 1 g relative to 100 g of water at 20° C., 0.01 to 1 part by weight of the sterically hindered phenolic compound, or the combination of 0.01 to 5 parts by weight of the hindered amine-based light stabilizer having the structure represented by the above-mentioned Formula (1) and 0.01 to 5 parts by weight of the ultraviolet absorber (E). The polyacetal resin raw material composition may contain a component other than components (A) to (E), within a range that does not harm the purpose of the invention. Moreover, to the polyacetal resin raw material composition, a component other than components (A) to (E) may be added within a range that does not harm the purpose of the invention. About the detail of respective components, the above-mentioned sections for explaining respective components can be referred to.

Improving Agent of Polyacetal Resin Raw Material Composition

The improving agent of the present invention is characterized by comprising 0.01 to 5 parts by weight of the colorant (B) selected from inorganic and organic pigments, 0.01 to 3 parts by weight of the polyamide resin (C) provided with at least one of such physical properties that the melting point or softening point is 180° C. or less, and the amine value is 2 mgKOH/g or more, or polyetheresteramide resin, 0.01 to 1 part by weight of the dihydrazide compound (D) selected from the group consisting of aromatic dihydrazide compounds, and aliphatic dihydrazide compounds having a solubility of less than 1 g relative to 100 g of water at 20° C., 0.01 to 1 part by weight of the sterically hindered phenolic compound (E), or a combination of 0.01 to 5 parts by weight of a hindered amine-based light stabilizer having the structure represented by the above-mentioned Formula (1) and 0.01 to parts by weight of an ultraviolet absorber. The improving agent of the invention is added to the polyacetal resin raw material composition containing a polyacetal resin. The addition of the improving agent of the invention can color the polyacetal resin raw material composition, and, in particular, can improve simultaneously the polyacetal resin raw material composition so as to suppress the tensile strength deterioration and the formaldehyde generation of molded articles. Moreover, when the hindered amine-based light stabilizer (E2) having the structure represented by the above-mentioned Formula (1) and the ultraviolet absorber (E3) are incorporated in the improving agent of the invention, it is possible to improve the polyacetal resin raw material composition so as to improve even the weather resistance. Meanwhile, the improving agent of the invention may contain a component other than components (A) to (E) within a range that does not harm the purpose of the invention. The detail of respective components of the improving agent of the invention may also be referred to the above-mentioned sections for explaining respective components.

The amount of improving agent of the invention to be added is preferably an amount that will incorporate (B) colorant 0.01 to 5 parts by weight in the improving agent, relative to 100 parts by weight of the polyacetal resin (A) contained in the polyacetal resin raw material composition. The lower limit of the colorant (B) is preferably 0.05 parts by weight or more, more preferably 0.1 parts by weight or more, and the upper limit thereof is preferably 3 parts by weight or less, more preferably 2 parts by weight or less.

Molding Method

The resin composition of the invention can be molded according to a known molding method of polyacetal resin. From the viewpoint of flowability and processability, an injection molding is preferable. Examples of the molded articles constituted of the resin composition of the invention include various products conventionally known as the application of polyacetal resin, including materials such as pellets, round bars and thick plates, sheets, tubes, various vessels, various machine, electric, automobile, building and other parts.

EXAMPLES

Hereinafter, the present invention will be explained more specifically with reference to Examples. The material, usage amount, percentage, treatment content, treatment procedure etc. shown in Examples below can be appropriately changed only if the change does not cause the deviation from the gist of the invention. Accordingly, the scope of the invention should not be construed in a limited way by specific examples shown below.

There are given below raw materials and measurement methods used in Examples and Comparative Examples.

<Raw Material>

(1) Polyacetal Resin

Acetal copolymer produced using 1,3-dioxolan as a comonomer so as to give 4.2% by weight relative to the resin, melt index (ASTM-D1238: 190° C., 2.16 Kg) 10.5 g/10 min (2) Inorganic Pigment Inorganic pigment-1: titanium white; Pigment White 6 (trade name: Tiepake CR-63, manufactured by Ishihara Sangyo Kaisha, Ltd.)

Inorganic pigment-2: titanium yellow; Pigment Yellow (trade name: Tiepake Yellow TY-70S, manufactured by Ishihara Sangyo Kaisha, Ltd.)

Inorganic pigment-3: carbon black; Pigment Black 7 (trade name: Printex, manufactured by Evonik Degussa Japan Co., Ltd.)

(3) Organic Pigment

Organic pigment-1: perinone-based orange; Pigment Orange 43 (trade name: PV Fast Orange GRL, manufactured by Clariant Japan K.K.)

Organic pigment-2: Phthalocyanine Blue; Pigment Blue 15:3 (trade name: Sumitomo Cyanine Blue GH, manufactured by SUMIKA COLOR CO., LTD.)

(4) Polyamide Resin

Polyamide resin-1: polyamide 6/66/610 terpolymer (trade name: AMILAN CM4000, melting point 140° C., amine value 3.0 mgKOH/g, manufactured by TORAY INDUSTRIES, INC.)

Polyamide resin-2: polyamide 12 (trade name: GrillAmide L20G, melting point 175° C., amine value 2.5 mgKOH/g, manufactured by EMS-CHEMIE (Japan) Ltd.)

Polyamide resin-3: polyamide 6 (trade name: Novamid (registered trade mark) 1010C2, melting point 220° C., amine value 1.5 mgKOH/g, manufactured by Mitsubishi Engineering-Plastics Corporation), which is not a polyamide resin as defined in the invention Polyamide resin-4: dimer acid polyamide resin (trade name: Leomide FT-409, melting point 115° C., amine value 10.4 mgKOH/g, manufactured by Kao Corporation)

Polyamide resin-5: dimer acid polyamide resin (trade name: Leomide FT-410, melting point 105° C., amine value 24.0 mgKOH/g, manufactured by Kao Corporation)

(5) Polyetheresteramide Resin

Polyetheresteramide resin-1: polyamide 12/polyoxyethylene glycol copolymer (Pelestat N1200, manufactured by Sanyo Chemical Industries, Ltd.), melting point=150° C.

Polyetheresteramide resin-2: dimer acid polyamide/polyoxyethylene glycol copolymer (trade name: TPAE-10HP, amine value 4.4 mgKOH/g, melting point=146, 180° C., manufactured by FUJI KASEI KOGYO CO., LTD.)

(6) Dihydrazide Compound

Dihydrazide compound-1: terephthalic acid dihydrazide; solubility 0.01 g or less relative to 100 g of water (20° C.) (product number: TDH, manufactured by JAPAN FINECHEM COMPANY, INC.)

Dihydrazide compound-2: 1,10-dodecane diacid dihydrazide; solubility 0.01 g or less relative to 100 g of water (20° C.) (product number: N-12, manufactured by JAPAN FINECHEM COMPANY, INC.)

Dihydrazide compound-3: adipic acid dihydrazide; solubility 9.1 g relative to 100 g of water (20° C.) (product number: ADH, manufactured by JAPAN FINECHEM COMPANY, INC.), which is not a dihydrazide compound as defined in the invention (7) Sterically Hindered Phenolic Compound Sterically hindered phenol-1: triethylene glycol-bis[3-(3-t-butyl-5-methyl-4-hydroxyphenyl)propionate], (trade name: IRGANOX 245, manufactured by Ciba Specialty Chemicals)

Sterically hindered phenol-2: N,N'-hexamethylenebis(3,5-di-t-butyl-4-hydroxy-hydrocinnamamide), (trade name: IRGANOX 1098, manufactured by Ciba Specialty Chemicals)

(8) Hindered Amine-Based Light Stabilizer

Hindered amine-based light stabilizer-1: a mixture of 1,2,2,6,6-pentamethyl-4-piperidyl- and tridecyl-1,2,3,4-butanetetracarboxylate (trade name: Adekastab LA-62, manufactured by ADEKA CORPORATION)

Hindered amine-based light stabilizer-2: condensate of dimethyl succinate with 4-hydroxy-2,2,6,6-tetramethyl-1-piperidine ethanol (trade name: Tinuvin 622, manufactured by Ciba Specialty Chemicals)

Hindered amine-based light stabilizer-3: bis(1,2,2,6,6-pentamethyl-4-piperidinyl)sebacate, (trade name: SANOL LS-765, manufactured by Sankyo Lifetech Co., Ltd.)

Hindered amine-based light stabilizer-4: bis(2,2,6,6-tetramethyl-4-piperidinyl)sebacate (trade name: SANOL LS-770, manufactured by Sankyo Lifetech Co., Ltd.), which is not a hindered amine-based light stabilizer as defined in the invention (9) Ultraviolet Absorber 2-(2H-benzotriazol-2-yl)-4,6-bis(1-methyl-1-phenylethyl)phenol, (trade name: Tinuvin 234, vapor pressure $2.0 \times 10^{-10}$ Pa at 20° C., manufactured by Ciba Specialty Chemicals)

(10) Amino-Substituted Triazine Compound

Melamine (product number: melamine, manufactured by Mitsui Chemicals, Inc.)

<Measurement and Evaluation>

The measurement and evaluation were performed by methods below.

(a) Amine Value

Polyamide resin-1 to polyamide resin-5, and polyetheresteramide resin-2 were weighed, 3 g each, and dissolved in m-cresol 80 ml. For potentiometric titration, AT-500N manufactured by KYOTO ELECTRONICS MANUFACTURING CO., LTD. was used, and the titration was performed according to a potentiometric method using a 0.05 mol/l perchloric acid methanol solution as a titrant. The obtained value was converted to that of KOH in mg to thereby give the amine value.

(b) Formaldehyde Generation Amount

As a test piece, a 100 mm×40 mm×2 mm flat plate was molded using a PS-40E5ASE molding machine manufactured by Nissei Plastic Industrial Co., Ltd. at a cylinder temperature of 215° C. On the day following the molding, for the test piece, the formaldehyde amount was measured by a method below, according to the method described in German Automobile Industrial Association Standard VDA275 (Automobile Indoor Parts—Quantitative measurement of discharged amount of formaldehyde by revised flask method).

(i) Distilled water 50 ml was put into a polyethylene vessel, the lid thereof was closed in such a state that the test piece was hung in the air, and the vessel was heated in a sealed state at 60° C. for 3 hr.

(ii) After leaving the vessel at room temperature for 60 min, the test piece was taken out.

(iii) The amount of formaldehyde absorbed into the distilled water in the polyethylene vessel was measured by acetylacetone colorimetry using a UV spectrometer.

(c) Mold-Polluting Property

Using a Minimat M8/7A molding machine manufactured by Sumitomo Heavy Industries Ltd. with a droplet type mold as shown in FIG. 1, 3000-shot continuous molding was performed at a molding temperature of 230° C. and a temperature of the mold being 35° C. After the end thereof, the state of matters adhering to the mold was observed with the naked eye, and evaluated on the basis of two levels of standards below. The droplet type mold in FIG. 1 is a mold designed so that the resin composition is introduced from the gate G and the gas generated accumulates easily at the pointed end portion P. The gate G has a width of 1 mm and a thickness of 1 mm, and, in FIG. 1, h1 is 14.5 mm, h2 is 7 mm and h3 is 27 mm, and the molding portion has a thickness of 3 mm.

◯: small amount of matters adhered to the mold, mold-polluting property is good

X: large amount of matters adhered to the mold, mold-polluting property is poor (d) Tensile Strength A test piece for ISO tensile test was formed according to ISO 9988-2 standard using an SG-75 injection molding machine manufactured by Sumitomo Heavy Industries, Ltd. Using the obtained test piece, the tensile strength was measured according to ISO 527 standard.

(e) Crack Generation Time (Weather Resistance)

As a test piece, a flat plate of 100 mm×40 mm×2 mm was molded at a cylinder temperature of 215° C. using a PS-40E5ASE molding machine manufactured by Nissei Plastic Industrial Co., Ltd. The obtained molded article was exposed to a Sunshine Weather-O-Meter "WEL-SUN-DCH-B" manufactured by Suga Test Instruments Co., Ltd. at 83° C. A crack generation time was defined as the time until such deterioration phenomenon as whitening or crack had began to be observed on the surface of the molded article with an optical microscope. A longer crack generation time represents a more excellent weather resistance.

Examples 1 to 9

Comparative Examples 1 to 9

Relative to 100 parts by weight of polyacetal resin, respective components were blended according to the weight blending formula shown in Tables 1 and 2 below, and, furthermore, ethylene bis-stearylamide 0.1 parts by weight as a dispersion aid and liquid paraffin 0.1 parts by weight as a spreading agent were blended, which were then mixed with a tumbler type blender. The obtained mixture was molten and kneaded at a cylinder temperature 200° C. and output rate 13 kg/hr using a 40 ramp single screw extruder (model: VS-40, manufactured by TANABE PLASTICS MACHINERY CO., LTD.) to be pelletized, thereby obtaining a polyacetal resin composition. The resin composition was dried at 80° C. for 4 hr, and then subjected to injection molding. For the molded article, the formaldehyde generation amount, mold-polluting property and tensile strength were measured.

Results are shown in Tables 1 and 2. Meanwhile, the formaldehyde generation amount is shown as a relative value on the basis of the value in Comparative Example 1 (1.00).

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| COMPOSITION | A | Polyacetal resin | Part by weight | 100 | 100 | 100 | 100 | 100 | 100 | 100 | 100 | 100 |
| | B | Inorganic pigment-1 | Part by weight | 0.5 | 0.5 | 0.5 | 0.3 | 0.3 | | | 0.5 | 0.5 |
| | | Inorganic pigment-2 | Part by weight | | | | 0.2 | 0.2 | | | | |
| | | Inorganic pigment-3 | Part by weight | 0.1 | 0.1 | 0.1 | 0.01 | 0.01 | | | 0.1 | 0.1 |
| | | Organic pigment-1 | Part by weight | | | | | | 0.4 | | | |
| | | Organic pigment-2 | Part by weight | | | | 0.01 | 0.01 | | 0.3 | | |
| | C1 | Polyamide resin-1 | Part by weight | 0.3 | | | 0.4 | 0.3 | | 0.2 | | |
| | | Polyamide resin-2 | Part by weight | | 0.3 | 0.3 | | | 0.3 | | | |
| | Other | Polyamide resin-3 | Part by weight | | | | | | | | | |
| | C1 | Polyamide resin-4 | Part by weight | | | | | | | | 0.2 | |
| | | Polyamide resin-5 | Part by weight | | | | | | | | | 0.2 |
| | D | Dihydrazide compound-1 | Part by weight | 0.1 | 0.1 | 0.1 | | 0.1 | 0.1 | | 0.1 | 0.1 |
| | | Dihydrazide compound-2 | Part by weight | | | | 0.1 | | | 0.1 | | |
| | Other | Dihydrazide compound-3 | Part by weight | | | | | | | | | |
| | E1 | Sterically hindered phenolic compound-1 | Part by weight | 0.3 | 0.3 | 0.3 | 0.3 | 0.3 | 0.3 | 0.3 | 0.3 | 0.3 |
| | F | Amino-substituted triazine compound | Part by weight | | | 0.05 | | | | | | |
| Evaluation | | Amount of formaldehyde Generation (On the basis of Comp. Ex. 1) | — | 0.10 | 0.14 | 0.12 | 0.11 | 0.09 | 0.08 | 0.10 | 0.05 | 0.03 |
| | | Mold-polluting property | — | ◯ | ◯ | ◯ | ◯ | ◯ | ◯ | ◯ | ◯ | ◯ |
| | | Tensile strength | MPa | 63 | 63 | 63 | 63 | 63 | 63 | 64 | 64 | 64 |

TABLE 2

|  |  |  |  | Comparative Example 1 | Comparative Example 2 | Comparative Example 3 | Comparative Example 4 | Comparative Example 5 |
|---|---|---|---|---|---|---|---|---|
| COMPOSITION | A | Polyacetal resin | Part by weight | 100 | 100 | 100 | 100 | 100 |
|  | B | Inorganic pigment-1 | Part by weight | 0.5 | 0.5 | 0.5 | 0.5 | 0.5 |
|  |  | Inorganic pigment-2 | Part by weight |  |  |  |  |  |
|  |  | Inorganic pigment-3 | Part by weight | 0.1 | 0.1 | 0.1 | 0.1 | 0.1 |
|  |  | Organic pigment-1 | Part by weight |  |  |  |  |  |
|  |  | Organic pigment-2 | Part by weight |  |  |  |  |  |
|  | C1 | Polyamide resin-1 | Part by weight |  |  |  | 0.3 | 0.3 |
|  |  | Polyamide resin-2 | Part by weight |  |  |  |  |  |
|  | Other | Polyamide resin-3 | Part by weight |  |  | 0.3 |  |  |
|  | C1 | Polyamide resin-4 | Part by weight |  |  |  |  |  |
|  |  | Polyamide resin-5 | Part by weight |  |  |  |  |  |
|  | D | Dihydrazide compound-1 | Part by weight | 0.1 | 1.2 | 0.1 |  | 0.1 |
|  |  | Dihydrazide compound-2 | Part by weight |  |  |  |  |  |
|  | Other | Dihydrazide compound-3 | Part by weight |  |  |  | 0.1 |  |
|  | E1 | Sterically hindered phenolic compound-1 | Part by weight | 0.3 | 0.3 | 0.3 | 0.3 |  |
|  | F | Amino-substituted triazine compound | Part by weight |  |  |  |  |  |
| Evaluation |  | Amount of formaldehyde Generation (On the basis of Comp. Ex. 1) | — | 1.00 | 0.10 | 1.40 | 0.90 | 2.00 |
|  |  | Mold-polluting property |  | ○ | X | ○ | ○ | ○ |
|  |  | Tensile strength | Mpa | 65 | 58 | 63 | 63 | 63 |

|  |  |  |  | Comparative Example 6 | Comparative Example 7 | Comparative Example 8 | Comparative Example 9 |
|---|---|---|---|---|---|---|---|
| COMPOSITION | A | Polyacetal resin | Part by weight | 100 | 100 | 100 | 100 |
|  | B | Inorganic pigment-1 | Part by weight | 0.3 |  |  | 0.5 |
|  |  | Inorganic pigment-2 | Part by weight | 0.2 |  |  |  |
|  |  | Inorganic pigment-3 | Part by weight | 0.01 |  |  | 0.1 |
|  |  | Organic pigment-1 | Part by weight |  | 0.4 |  |  |
|  |  | Organic pigment-2 | Part by weight | 0.01 |  | 0.3 |  |
|  | C1 | Polyamide resin-1 | Part by weight |  |  |  |  |
|  |  | Polyamide resin-2 | Part by weight |  |  |  |  |
|  | Other | Polyamide resin-3 | Part by weight |  |  |  |  |
|  | C1 | Polyamide resin-4 | Part by weight |  |  |  |  |
|  |  | Polyamide resin-5 | Part by weight |  |  |  |  |
|  | D | Dihydrazide compound-1 | Part by weight |  | 0.1 |  | 2.1 |
|  |  | Dihydrazide compound-2 | Part by weight | 0.1 |  | 0.1 |  |
|  | Other | Dihydrazide compound-3 | Part by weight |  |  |  |  |
|  | E1 | Sterically hindered phenolic compound-1 | Part by weight | 0.3 | 0.3 | 0.3 | 0.3 |
|  | F | Amino-substituted triazine compound | Part by weight |  |  |  |  |
| Evaluation |  | Amount of formaldehyde Generation (On the basis of Comp. Ex. 1) | — | 1.20 | 0.80 | 0.90 | 0.05 |
|  |  | Mold-polluting property |  | ○ | ○ | ○ | X |
|  |  | Tensile strength | Mpa | 65 | 65 | 65 | 56 |

As is clear from Tables 1 and 2, it is shown that the polyacetal resin composition of the invention is an excellent one, such that it exerts simultaneously the effect of suppressing the formaldehyde generation, the effect of suppressing the mold pollution, and the effect of suppressing the mechanical strength deterioration, in spite of the coloring with pigment. In particular, when a polyamide resin having a high amine value is incorporated, a high effect of suppressing the formaldehyde generation is exerted. On the other hand, in Comparative Example 1 containing no polyamide resin of the invention, the amount of formaldehyde generation is large, and in Comparative Examples 2 and 9 containing an increased content of a dihydrazide compound without the incorporation of the polyamide resin, the amount of formaldehyde generation is reduced, but the mold pollution is remarkable and in addition, the tensile strength deteriorates. Comparative Example 3 is an example formed by incorporating polyamide 6 (polyamide resin-3) that is a polyamide resin having a melting point exceeding 180° C. in place of polyamide 12 (polyamide resin-2) in Example 2, and shows a larger amount of formaldehyde generation than that in Example 1. Comparative Example 4 is an example formed by incorporating an aliphatic dihydrazide (dihydrazide compound-3) having a large water solubility, and shows a large amount of formaldehyde generation. Comparative Example 5 is an example containing no sterically hindered phenolic compound, and shows a large amount of formaldehyde generation, in the same way. Comparative Examples 6, 7 and 8 are examples repeating Examples 4, 6 and 7, respectively, without incorporating polyamide resin, and all of them show a large amount of formaldehyde generation.

In Examples 1 to 9, relative to 100 parts by weight of the polyacetal resin, when the addition amount of the colorant is less than 0.01 parts by weight, the coloring effect remarkably deteriorates, and when it is more than 5 parts by weight, the effect of suppressing the formaldehyde generation remarkably deteriorates. Furthermore, in Examples 1 to 9, relative to 100 parts by weight of the polyacetal resin, when the addition amount of the polyamide resin satisfying the condition of the invention is less than 0.01 parts by weight, the effect of suppressing the formaldehyde generation remarkably deteriorates, and when it is more than 3 parts by weight, the mechanical strength of molded articles remarkably deteriorates. Moreover, in Examples 1 to 9, relative to 100 parts by weight of the polyacetal resin, when the addition amount of the dihydrazide compound satisfying the condition of the invention is less than 0.01 parts by weight, the effect of suppressing the formaldehyde generation remarkably deteriorates, and when it is more than 1 part by weight, the effect of suppressing the mold pollution remarkably deteriorates. Furthermore, in Examples 1 to 9, relative to 100 parts by weight of the polyacetal resin, when the addition amount of the sterically hindered phenolic compound is less than 0.01 parts by weight, the effect of suppressing the formaldehyde generation remarkably deteriorates, and when it is more than 1 part by weight, the effect of suppressing the mold pollution remarkably deteriorates. The polyacetal resin composition of the invention can satisfy all of the effect of coloring, effect of suppressing the formaldehyde generation, effect of suppressing the mold pollution, and effect of suppressing the mechanical strength deterioration, by controlling the addition amount of respective components within specified ranges, respectively, relative to the polyacetal resin.

Examples 21 to 30

Comparative Examples 21 to 32

Relative to 100 parts by weight of the polyacetal resin, respective components were blended according to the weight blending formula shown in Tables 3 and 4 below, and, furthermore, ethylene bis-srearylamide 0.1 parts by weight as a dispersion aid and liquid paraffin 0.1 parts by weight as a spreading agent were blended, which were then mixed with a tumbler type blender. The obtained mixture was molten and kneaded with a 40 mmφ single screw extruder (model: VS-40, manufactured by TANABE PLASTICS MACHINERY CO., LTD.) at a cylinder temperature 200° C. and an output rate 13 kg/hr to be pelletized, thereby giving a polyacetal resin composition. The resin composition was dried at 80° C. for 4 hr, and then was subjected to injection molding. For the molded article, the amount of formaldehyde generation, crack generation time, mold-polluting property and tensile strength were measured.

Tables 3 and 4 show the results. Meanwhile, the formaldehyde generation amount is shown as a relative value on the basis of the value in Comparative Example 21 (1.00).

TABLE 3

| | | | | Example 21 | Example 22 | Example 23 | Example 24 | Example 25 | Example 26 | Example 27 | Example 28 | Example 29 | Example 30 |
|---|---|---|---|---|---|---|---|---|---|---|---|---|---|
| COMPOSITION | A | Polyacetal resin | Part by weight | 100 | 100 | 100 | 100 | 100 | 100 | 100 | 100 | 100 | 100 |
| | B | Inorganic pigment-1 | Part by weight | 0.5 | 0.5 | 0.5 | 0.5 | 0.5 | 0.5 | | | | |
| | | Inorganic pigment-3 | Part by weight | 0.1 | 0.1 | 0.1 | 0.1 | 0.1 | 0.1 | | | | |
| | | Organic pigment-1 | Part by weight | | | | | | | 0.4 | 0.4 | | |
| | | Organic pigment-2 | Part by weight | | | | | | | | | 0.3 | 0.3 |
| | C1 | Polyamide resin-1 | Part by weight | 0.3 | 0.3 | 0.3 | 0.3 | | 0.3 | 0.3 | | 0.3 | |
| | | Polyamide resin-4 | Part by weight | | | | | 0.2 | | | 0.2 | | 0.2 |
| | Other | Polyamide resin-3 | Part by weight | | | | | | | | | | |
| | D | Dihydrazide compound-1 | Part by weight | 0.1 | 0.1 | 0.1 | | 0.1 | 0.1 | 0.1 | 0.1 | 0.1 | |
| | | Dihydrazide compound-2 | Part by weight | | | | 0.1 | | | | | | 0.1 |
| | Other | Dihydrazide compound-3 | Part by weight | | | | | | | | | | |
| | E1 | Sterically hindered phenolic compound-2 | Part by weight | 0.03 | 0.03 | 0.03 | 0.03 | 0.03 | 0.03 | 0.03 | 0.03 | 0.03 | 0.03 |
| | E2 | Hindered amine-based light stabilizer-1 | Part by weight | 0.3 | | | 0.3 | 0.3 | | | | | |
| | | Hindered amine-based light stabilizer-2 | Part by weight | | 0.3 | | | | 0.3 | 0.3 | 0.3 | 0.3 | 0.3 |
| | | Hindered amine-based light stabilizer-3 | Part by weight | | | 0.3 | | | | | | | |
| | Other | Hindered amine-based light stabilizer-4 | Part by weight | | | | | | | | | | |
| | E3 | Ultraviolet absorber | Part by weight | 0.3 | 0.3 | 0.3 | 0.3 | 0.3 | 0.3 | 0.3 | 0.3 | 0.3 | 0.3 |
| | F | Amino-substituted triazine compound | Part by weight | | | | | | 0.1 | | | | |
| Evaluation | | Amount of formaldehyde Generation (On the basis of Comp. Ex. 21) | — | 0.08 | 0.08 | 0.10 | 0.07 | 0.03 | 0.05 | 0.07 | 0.03 | 0.17 | 0.11 |
| | | Crack generation time | Hour | 1000 | 1000 | 950 | 1000 | 1050 | 1000 | 800 | 800 | 800 | 800 |
| | | Mold-polluting property | — | ○ | ○ | ○ | ○ | ○ | ○ | ○ | ○ | ○ | ○ |
| | | Tensile strength | MPa | 63 | 63 | 63 | 63 | 63 | 63 | 63 | 63 | 62 | 63 |

TABLE 4

| | | | | Comparative Example 21 | Comparative Example 22 | Comparative Example 23 | Comparative Example 24 | Comparative Example 25 | Comparative Example 26 |
|---|---|---|---|---|---|---|---|---|---|
| COMPOSITION | A | Polyacetal resin | Part by weight | 100 | 100 | 100 | 100 | 100 | 100 |
| | B | Inorganic pigment-1 | Part by weight | 0.5 | 0.5 | 0.5 | 0.5 | 0.5 | 0.5 |
| | | Inorganic pigment-3 | Part by weight | 0.1 | 0.1 | 0.1 | 0.1 | 0.1 | 0.1 |
| | | Organic pigment-1 | Part by weight | | | | | | |
| | | Organic pigment-2 | Part by weight | | | | | | |
| | C1 | Polyamide resin-1 | Part by weight | | | | | | |
| | | Polyamide resin-4 | Part by weight | | | | | | |
| | Other | Polyamide resin-3 | Part by weight | | | | | | |
| | D | Dihydrazide compound-1 | Part by weight | | 0.1 | 0.1 | 0.1 | 0.1 | 0.5 |
| | | Dihydrazide compound-2 | Part by weight | | | | | | |
| | Other | Dihydrazide compound-3 | Part by weight | | | | | | |
| | E1 | Sterically hindered phenolic compound-2 | Part by weight | 0.03 | 0.03 | 0.03 | 0.03 | 0.03 | 0.03 |
| | E2 | Hindered amine-based light stabilizer-1 | Part by weight | | | 0.3 | | 0.3 | 0.3 |
| | | Hindered amine-based light stabilizer-2 | Part by weight | | | | | | |
| | | Hindered amine-based light stabilizer-3 | Part by weight | | | | | | |
| | Other | Hindered amine-based light stabilizer-4 | Part by weight | | | | 0.3 | | |
| | E3 | Ultraviolet absorber | Part by weight | | | 0.3 | 0.3 | 0.3 | 0.3 |
| | F | Amino-substituted triazine compound | Part by weight | | | | | | |
| Evaluation | | Amount of formaldehyde Generation (On the basis of Comp. Ex. 21) | — | 1.0 | 1.9 | 1.0 | 1.1 | 4.5 | 0.10 |
| | | Crack generation time | Hour | 100 | 950 | 150 | 100 | 1000 | 950 |
| | | Mold-polluting property | — | ○ | ○ | ○ | ○ | ○ | X |
| | | Tensile strength | MPa | 65 | 64 | 65 | 65 | 64 | 59 |

| | | | | Comparative Example 27 | Comparative Example 28 | Comparative Example 29 | Comparative Example 30 | Comparative Example 31 | Comparative Example 32 |
|---|---|---|---|---|---|---|---|---|---|
| COMPOSITION | A | Polyacetal resin | Part by weight | 100 | 100 | 100 | 100 | 100 | 100 |
| | B | Inorganic pigment-1 | Part by weight | 0.5 | 0.5 | 0.5 | 0.5 | | |
| | | Inorganic pigment-3 | Part by weight | 0.1 | 0.1 | 0.1 | 0.1 | | |
| | | Organic pigment-1 | Part by weight | | | | | 0.4 | |
| | | Organic pigment-2 | Part by weight | | | | | | 0.3 |
| | C1 | Polyamide resin-1 | Part by weight | 0.3 | | | | | |
| | | Polyamide resin-4 | Part by weight | | | | 0.3 | | |
| | Other | Polyamide resin-3 | Part by weight | | | | | | |
| | D | Dihydrazide compound-1 | Part by weight | | | 0.1 | | 0.1 | 0.1 |
| | | Dihydrazide compound-2 | Part by weight | | | | | | |
| | Other | Dihydrazide compound-3 | Part by weight | | 0.1 | | 0.1 | | |
| | E1 | Sterically hindered phenolic compound-2 | Part by weight | 0.03 | 0.03 | 0.03 | 0.03 | 0.03 | 0.03 |
| | E2 | Hindered amine-based light stabilizer-1 | Part by weight | 0.3 | 0.3 | 0.3 | 0.3 | | |
| | | Hindered amine-based light stabilizer-2 | Part by weight | | | | | 0.3 | 0.3 |
| | | Hindered amine-based light stabilizer-3 | Part by weight | | | | | | |
| | Other | Hindered amine-based light stabilizer-4 | Part by weight | | | | | | |
| | E3 | Ultraviolet absorber | Part by weight | 0.3 | 0.3 | 0.3 | 0.3 | 0.3 | 0.3 |
| | F | Amino-substituted triazine compound | Part by weight | | | | 0.3 | | |
| Evaluation | | Amount of formaldehyde Generation (On the basis of Comp. Ex. 21) | — | 3.8 | 1.6 | 1.4 | 0.90 | 0.85 | 0.80 |
| | | Crack generation time | Hour | 1000 | 900 | 950 | 900 | 800 | 800 |
| | | Mold-polluting property | — | ○ | ○ | ○ | ○ | ○ | ○ |
| | | Tensile strength | MPa | 63 | 64 | 64 | 63 | 63 | 63 |

As is clear from Tables 3 and 4, it is shown that the polyacetal resin composition of the invention is an excellent one, such that it exerts simultaneously the effect of suppressing the formaldehyde generation, the effect of improving the weather resistance, the effect of suppressing the mold pollution, and the effect of suppressing the mechanical strength deterioration, in spite of the coloring with pigment. In particular, when a polyamide resin having a high amine value is incorporated, a high effect of suppressing the formaldehyde generation is exerted. On the other hand, in Comparative Examples 21 to 25, 28, 29, 31 and 32 containing no polyamide resin of the invention, the amount of formaldehyde generation is large, and in Comparative Example 26 containing an increased content of a dihydrazide compound without the incorporation of the polyamide resin, the amount of formaldehyde generation is reduced, but the mold pollution is remarkable and in addition, the tensile strength deteriorates. Comparative Example 27 containing no dihydrazide compound of the invention, and Comparative Example 30 containing aliphatic dihydrazide (dihydrazide compound-3) having a large water solubility show a large amount of formaldehyde generation. Comparative Examples 21 and 23 containing no ultraviolet absorber show a short crack generation time, and thus poor weather resistance.

In Examples 21 to 30, relative to 100 parts by weight of the polyacetal resin, when the addition amount of the colorant is less than 0.01 parts by weight, the coloring effect remarkably deteriorates, and when it is more than 5 parts by weight, the effect of suppressing the formaldehyde generation remarkably deteriorates. Moreover, in Examples 21 to 30, relative to 100 parts by weight of the polyacetal resin, when the addition amount of the polyamide resin satisfying the condition of the invention is less than 0.01 parts by weight, the effect of suppressing the formaldehyde generation remarkably deteriorates, and when it is more than 3 parts by weight, the mechanical strength of molded articles remarkably deteriorates. Further, in Examples 21 to 30, relative to 100 parts by weight of the polyacetal resin, when the addition amount of the dihydrazide compound satisfying the condition of the invention is less than 0.01 parts by weight, the effect of suppressing the formaldehyde generation remarkably deteriorates, and when it is more than 1 part by weight, the effect of suppressing the mold pollution remarkably deteriorates. Further, in Examples 21 to 30, relative to 100 parts by weight of the polyacetal resin, when the addition amount of the hindered amine-based light stabilizer is less than 0.01 parts by weight, the weather resistance remarkably deteriorates, and when it is more than 5 parts by weight, the mechanical strength remarkably deteriorates, and in addition, the mold pollution increases. Furthermore, in Examples 21 to 30, relative to 100 parts by weight of the polyacetal resin, when the addition amount of the ultraviolet absorber is less than 0.01 parts by weight, the weather resistance remarkably deteriorates, and when it is more than 5 parts by weight, the mechanical property remarkably deteriorates. The polyacetal resin composition of the invention can satisfy all of the effect of coloring, effect of suppressing the formaldehyde generation, effect of improving the weather resistance, effect of suppressing the mold pollution, and effect of suppressing the mechanical strength deterioration, by controlling the addition amount of respective components within specified ranges, respectively, relative to the polyacetal resin.

Examples 41 to 52

Comparative Examples 41 to 49

Relative to 100 parts by weight of the polyacetal resin, respective components were blended according to the weight blending formula shown in Tables 5 and 6 below, and, furthermore, ethylene bis-srearylamide 0.1 parts by weight as a dispersion aid and liquid paraffin 0.1 parts by weight as a spreading agent were blended, which were then mixed with a tumbler type blender. The obtained mixture was molten and kneaded with a 40 mmϕ single screw extruder (model: VS-40, manufactured by TANABE PLASTICS MACHINERY CO., LTD.) at a cylinder temperature 200° C. and an output rate 13 kg/hr to be pelletized, thereby giving a polyacetal resin composition. The resin composition was dried at 80° C. for 4 hr, and then was subjected to injection molding. For the molded article, the amount of formaldehyde generation, mold-polluting property and tensile strength were measured.

Tables 5 and 6 show the results. Meanwhile, the formaldehyde generation amount is shown as a relative value on the basis of the value in Comparative Example 41 (1.00).

TABLE 5

| | | | | Example 41 | Example 42 | Example 43 | Example 44 | Example 45 | Example 46 |
|---|---|---|---|---|---|---|---|---|---|
| COMPO-SITION | A | Polyacetal resin | Part by weight | 100 | 100 | 100 | 100 | 100 | 100 |
| | B | Inorganic pigment-1 | Part by weight | 0.5 | 0.5 | 0.5 | 0.5 | 0.3 | 0.3 |
| | | Inorganic pigment-2 | Part by weight | | | | | 0.2 | 0.2 |
| | | Inorganic pigment-3 | Part by weight | 0.1 | 0.1 | 0.1 | 0.1 | 0.01 | 0.01 |
| | | Organic pigment-1 | Part by weight | | | | | | |
| | | Organic pigment-2 | Part by weight | | | | | 0.01 | 0.01 |
| | C2 | Polyetheresteramide resin-1 | Part by weight | 0.3 | 0.3 | | | 0.4 | |
| | | Polyetheresteramide resin-2 | Part by weight | | | 0.3 | 0.3 | | 0.4 |
| | D | Dihydrazide compound-1 | Part by weight | 0.1 | 0.1 | 0.1 | 0.1 | | |
| | | Dihydrazide compound-2 | Part by weight | | | | | 0.1 | 0.1 |
| | Other | Dihydrazide compound-3 | Part by weight | | | | | | |
| | E1 | Sterically hindered phenolic Compound-1 | Part by weight | 0.3 | 0.3 | 0.3 | 0.3 | 0.3 | 0.3 |
| | F | Amino-substituted triazine compound | Part by weight | | 0.05 | | 0.05 | | |
| Evaluation | | Amount of formaldehyde generation (On the basis of Comp. Ex. 41) | — | 0.12 | 0.10 | 0.14 | 0.12 | 0.13 | 0.15 |
| | | Mold-polluting property | — | ○ | ○ | ○ | ○ | ○ | ○ |
| | | Tensile strength | MPa | 63 | 63 | 63 | 63 | 63 | 63 |

| | | | | Example 47 | Example 48 | Example 49 | Example 50 | Example 51 | Example 52 |
|---|---|---|---|---|---|---|---|---|---|
| COMPO-SITION | A | Polyacetal resin | Part by weight | 100 | 100 | 100 | 100 | 100 | 100 |
| | B | Inorganic pigment-1 | Part by weight | 0.3 | 0.3 | | | | |
| | | Inorganic pigment-2 | Part by weight | 0.2 | 0.2 | | | | |
| | | Inorganic pigment-3 | Part by weight | 0.01 | 0.01 | | | | |
| | | Organic pigment-1 | Part by weight | | | 0.4 | 0.4 | | |
| | | Organic pigment-2 | Part by weight | 0.01 | 0.01 | | | 0.3 | 0.3 |

TABLE 5-continued

|  |  |  |  |  |  |  |  |  |  |
|---|---|---|---|---|---|---|---|---|---|
|  | C2 | Polyetheresteramide resin-1 | Part by weight | 0.3 |  | 0.3 |  | 0.2 |  |
|  |  | Polyetheresteramide resin-2 | Part by weight |  | 0.3 |  | 0.3 |  | 0.2 |
|  | D | Dihydrazide compound-1 | Part by weight | 0.1 | 0.1 | 0.1 | 0.1 |  |  |
|  |  | Dihydrazide compound-2 | Part by weight |  |  |  |  | 0.1 | 0.1 |
|  | Other | Dihydrazide compound-3 | Part by weight |  |  |  |  |  |  |
|  | E1 | Sterically hindered phenolic Compound-1 | Part by weight | 0.3 | 0.3 | 0.3 | 0.3 | 0.3 | 0.3 |
|  | F | Amino-substituted triazine compound | Part by weight |  |  |  |  |  |  |
| Evaluation |  | Amount of formaldehyde generation (On the basis of Comp. Ex. 41) | — | 0.10 | 0.12 | 0.07 | 0.09 | 0.11 | 0.13 |
|  |  | Mold-polluting property | — | ○ | ○ | ○ | ○ | ○ | ○ |
|  |  | Tensile strength | MPa | 63 | 63 | 63 | 63 | 63 | 63 |

TABLE 6

|  |  |  |  | Comparative Example 41 | Comparative Example 42 | Comparative Example 43 | Comparative Example 44 | Comparative Example 45 | Comparative Example 46 | Comparative Example 47 | Comparative Example 48 | Comparative Example 49 |
|---|---|---|---|---|---|---|---|---|---|---|---|---|
| COMPOSITION | A | Polyacetal resin | Part by weight | 100 | 100 | 100 | 100 | 100 | 100 | 100 | 100 | 100 |
|  | B | Inorganic pigment-1 | Part by weight | 0.5 | 0.5 | 0.5 | 0.5 | 0.5 | 0.5 | 0.3 |  |  |
|  |  | Inorganic pigment-2 | Part by weight |  |  |  |  |  |  | 0.2 |  |  |
|  |  | Inorganic pigment-3 | Part by weight | 0.1 | 0.1 | 0.1 | 0.1 | 0.1 | 0.1 | 0.01 |  |  |
|  |  | Organic pigment-1 | Part by weight |  |  |  |  |  |  |  | 0.4 |  |
|  |  | Organic pigment-2 | Part by weight |  |  |  |  |  |  | 0.01 |  | 0.3 |
|  | C2 | Polyetheresteramide resin-1 | Part by weight |  |  | 0.3 |  | 0.3 |  |  |  |  |
|  |  | Polyetheresteramide resin-2 | Part by weight |  |  |  | 0.3 |  | 0.3 |  |  |  |
|  | D | Dihydrazide compound-1 | Part by weight | 0.1 | 1.2 |  |  | 0.1 | 0.1 |  | 0.1 |  |
|  |  | Dihydrazide compound-2 | Part by weight |  |  |  |  |  |  | 0.1 |  | 0.1 |
|  | Other | Dihydrazide compound-3 | Part by weight |  |  | 0.1 | 0.1 |  |  |  |  |  |
|  | E1 | Sterically hindered phenolic Compound-1 | Part by weight | 0.3 | 0.3 | 0.3 | 0.3 |  |  | 0.3 | 0.3 | 0.3 |
|  | F | Amino-substituted triazine compound | Part by weight |  |  |  |  |  |  |  |  |  |
| Evaluation |  | Amount of formaldehyde Generation (On the basis of Comp. Ex. 41) | — | 1 | 0.1 | 0.8 | 0.9 | 2 | 2.1 | 1.2 | 0.8 | 0.9 |
|  |  | Mold-polluting property | — | ○ | X | ○ | ○ | ○ | ○ | ○ | ○ | ○ |
|  |  | Tensile strength | MPa | 65 | 58 | 63 | 63 | 63 | 63 | 65 | 65 | 65 |

As is clear from Tables 5 and 6, it is shown that the polyacetal resin composition of the invention is an excellent one, such that it exerts simultaneously the effect of suppressing the formaldehyde generation, the effect of suppressing the mold pollution, and the effect of suppressing the mechanical strength deterioration, in spite of the coloring with pigment. On the other hand, in Comparative Example 41 containing no polyetheresteramide resin of the invention, the amount of formaldehyde generation is large, and in Comparative Example 42 containing an increased content of a dihydrazide compound without the incorporation of the polyetheresteramide resin, the amount of formaldehyde generation is reduced, but the mold pollution is remarkable. Comparative Examples 43 and 44 are examples in which aliphatic dihydrazide (dihydrazide compound-3) having a large water solubility is incorporated in place of dihydrazide compound (dihydrazide compound-1) of the invention in Examples 41 and 43, and show a large amount of formaldehyde generation. Comparative Examples 45 and 46 are examples containing no sterically hindered phenolic compound and show a large amount of formaldehyde generation in the same way. Comparative Examples 47, 48 and 49 are examples repeating Example 45, 49, and 51 and 52, respectively, without incorporating polyetheresteramide resin, and all of them show a large amount of formaldehyde generation.

In Examples 41 to 52, relative to 100 parts by weight of the polyacetal resin, when the addition amount of the colorant is less than 0.01 parts by weight, the coloring effect remarkably deteriorates, and when it is more than 5 parts by weight, the effect of suppressing the formaldehyde generation remarkably deteriorates. Moreover, in Examples 41 to 52, relative to 100 parts by weight of the polyacetal resin, when the addition amount of the polyetheresteramide resin satisfying the condition of the invention is less than 0.01 parts by weight, the effect of suppressing the formaldehyde generation remarkably deteriorates, and when it is more than 3 parts by weight, the mechanical strength of molded articles remarkably deteriorates. Further, in Examples 41 to 52, relative to 100 parts by weight of the polyacetal resin, when the addition amount of the dihydrazide compound satisfying the condition of the invention is less than 0.01 parts by weight, the effect of suppressing the formaldehyde generation remarkably deteriorates, and when it is more than 1 part by weight, the effect of suppressing the mold pollution remarkably deteriorates. Furthermore, in Examples 41 to 52, relative to 100 parts by weight of the polyacetal resin, when the addition amount of the sterically hindered phenolic compound is less than 0.01 parts by weight, the effect of suppressing the formaldehyde generation remarkably deteriorates, and when it is more than 1 part by weight, the effect of suppressing the mold pollution remarkably deteriorates. The polyacetal resin composition of the invention can satisfy all of the effect of coloring, effect of suppressing the formaldehyde generation, effect of suppressing the mold pollution, and effect of suppressing the mechanical strength deterioration, by controlling the addition amount of respective components within specified ranges, respectively, relative to the polyacetal resin.

Examples 61 to 73

Comparative Examples 61 to 71

Relative to 100 parts by weight of the polyacetal resin, respective components were blended according to the weight blending formula shown in Tables 7 and 8 below, and, furthermore, ethylene bis-srearylamide 0.1 parts by weight as a dispersion aid and liquid paraffin 0.1 parts by weight as a spreading agent were blended, which were then mixed with a tumbler type blender. The obtained mixture was molten and kneaded with a 40 mmφ single screw extruder (model: VS-40, manufactured by TANABE PLASTICS MACHINERY CO., LTD.) at a cylinder temperature 200° C. and an output rate 13 kg/hr to be pelletized, thereby giving a polyacetal resin composition. The resin composition was dried at 80° C. for 4 hr, and then was subjected to injection molding. For the molded article, the amount of formaldehyde generation, crack generation time and tensile strength were measured.

Tables 7 and 8 show the results. Meanwhile, the formaldehyde generation amount is shown as a relative value on the basis of the value in Comparative Example 61 (1.00).

TABLE 7

| | | | | Example 61 | Example 62 | Example 63 | Example 64 | Example 65 | Example 66 | Example 67 |
|---|---|---|---|---|---|---|---|---|---|---|
| COMPOSITION | A | Polyacetal resin | Part by weight | 100 | 100 | 100 | 100 | 100 | 100 | 100 |
| | B | Inorganic pigment-1 | Part by weight | 0.5 | 0.5 | 0.5 | 0.5 | 0.5 | 0.5 | 0.5 |
| | | Inorganic pigment-3 | Part by weight | 0.1 | 0.1 | 0.1 | 0.1 | 0.1 | 0.1 | 0.1 |
| | | Organic pigment-1 | Part by weight | | | | | | | |
| | | Organic pigment-2 | Part by weight | | | | | | | |
| | C2 | Polyetheresteramide compound-1 | Part by weight | 0.3 | 0.3 | 0.3 | 0.3 | | | |
| | | Polyetheresteramide compound-2 | Part by weight | | | | | 0.3 | 0.3 | 0.3 |
| | D | Dihydrazide compound-1 | Part by weight | 0.1 | 0.1 | 0.1 | | 0.1 | 0.1 | 0.1 |
| | | Dihydrazide compound-2 | Part by weight | | | | 0.1 | | | |
| | Other | Dihydrazide compound-3 | Part by weight | | | | | | | |
| | E1 | Sterically hindered phenolic compound-2 | Part by weight | 0.03 | 0.03 | 0.03 | 0.03 | 0.03 | 0.03 | 0.03 |
| | E2 | Hindered amine-based light stabilizer-1 | Part by weight | 0.3 | | | 0.3 | 0.3 | | |
| | | Hindered amine-based light stabilizer-2 | Part by weight | | 0.3 | | | | 0.3 | |
| | | Hindered amine-based light stabilizer-3 | Part by weight | | | 0.3 | | | | 0.3 |
| | Other | Hindered amine-based light stabilizer-4 | Part by weight | | | | | | | |
| | E3 | Ultraviolet absorber | Part by weight | 0.3 | 0.3 | 0.3 | 0.3 | 0.3 | 0.3 | 0.3 |
| | F | Amino-substituted triazine compound | Part by weight | | | | | | | |
| Evaluation | | Amount of formaldehyde Generation (On the basis of Comp. Ex. 61) | — | | 0.08 | 0.08 | 0.09 | 0.09 | 0.09 | 0.09 | 0.1 |
| | | Crack generation time | Hour | 1000 | 1000 | 950 | 1000 | 1000 | 1000 | 950 |
| | | Mold-polluting property | — | ○ | ○ | ○ | ○ | ○ | ○ | ○ |
| | | Tensile strength | MPa | 63 | 63 | 63 | 63 | 63 | 63 | 63 |

| | | | | Example 68 | Example 69 | Example 70 | Example 71 | Example 72 | Example 73 |
|---|---|---|---|---|---|---|---|---|---|
| COMPOSITION | A | Polyacetal resin | Part by weight | 100 | 100 | 100 | 100 | 100 | 100 |
| | B | Inorganic pigment-1 | Part by weight | 0.5 | 0.5 | | | | |
| | | Inorganic pigment-3 | Part by weight | 0.1 | 0.1 | | | | |
| | | Organic pigment-1 | Part by weight | | | 0.4 | 0.4 | | |
| | | Organic pigment-2 | Part by weight | | | | | 0.3 | 0.3 |
| | C2 | Polyetheresteramide compound-1 | Part by weight | | 0.3 | 0.3 | 0.3 | 0.3 | |
| | | Polyetheresteramide compound-2 | Part by weight | 0.3 | | | 0.3 | | 0.3 |
| | D | Dihydrazide compound-1 | Part by weight | | 0.1 | 0.1 | 0.1 | 0.1 | 0.1 |
| | | Dihydrazide compound-2 | Part by weight | 0.1 | | | | | |
| | Other | Dihydrazide compound-3 | Part by weight | | | | | | |
| | E1 | Sterically hindered phenolic compound-2 | Part by weight | 0.03 | 0.03 | 0.03 | 0.03 | 0.03 | 0.03 |
| | E2 | Hindered amine-based light stabilizer-1 | Part by weight | 0.3 | | | | | |
| | | Hindered amine-based light stabilizer-2 | Part by weight | | 0.3 | 0.3 | 0.3 | 0.3 | 0.3 |
| | | Hindered amine-based light stabilizer-3 | Part by weight | | | | | | |

TABLE 7-continued

|  |  |  |  |  |  |  |  |  |  |
|---|---|---|---|---|---|---|---|---|---|
|  |  | Other | Hindered amine-based light stabilizer-4 | Part by weight |  |  |  |  |  |  |
|  |  | E3 | Ultraviolet absorber | Part by weight | 0.3 | 0.3 | 0.3 | 0.3 | 0.3 | 0.3 |
|  |  | F | Amino-substituted triazine compound | Part by weight |  | 0.1 |  |  |  |  |
|  | Evaluation |  | Amount of formaldehyde Generation (On the basis of Comp. Ex. 61) | — |  | 0.1 | 0.07 | 0.09 | 0.1 | 0.18 | 0.19 |
|  |  |  | Crack generation time | Hour | 1000 | 1000 | 800 | 800 | 800 | 800 |
|  |  |  | Mold-polluting property | — | ○ | ○ | ○ | ○ | ○ | ○ |
|  |  |  | Tensile strength | MPa | 63 | 63 | 63 | 63 | 63 | 63 |

TABLE 8

|  |  |  |  | Comparative Example 61 | Comparative Example 62 | Comparative Example 63 | Comparative Example 64 | Comparative Example 65 | Comparative Example 66 |
|---|---|---|---|---|---|---|---|---|---|
| COMPO-SITION | A | Polyacetal resin | Part by weight | 100 | 100 | 100 | 100 | 100 | 100 |
|  | B | Inorganic pigment-1 | Part by weight | 0.5 | 0.5 | 0.5 | 0.5 | 0.5 | 0.5 |
|  |  | Inorganic pigment-3 | Part by weight | 0.1 | 0.1 | 0.1 | 0.1 | 0.1 | 0.1 |
|  |  | Organic pigment-1 | Part by weight |  |  |  |  |  |  |
|  |  | Organic pigment-2 | Part by weight |  |  |  |  |  |  |
|  | C2 | Polyetheresteramide compound-1 | Part by weight |  |  |  |  |  |  |
|  |  | Polyetheresteramide compound-2 | Part by weight |  |  |  |  |  |  |
|  | D | Dihydrazide compound-1 | Part by weight | 0.1 | 0.1 | 0.1 | 0.1 |  | 1.2 |
|  |  | Dihydrazide compound-2 | Part by weight |  |  |  |  |  |  |
|  | Other | Dihydrazide compound-3 | Part by weight |  |  |  |  |  |  |
|  | E1 | Sterically hindered phenolic compound-2 | Part by weight | 0.03 | 0.03 | 0.03 | 0.03 | 0.03 | 0.03 |
|  | E2 | Hindered amine-based light stabilizer-1 | Part by weight |  | 0.3 |  |  | 0.3 | 0.3 |
|  |  | Hindered amine-based light stabilizer-2 | Part by weight |  |  |  |  |  |  |
|  |  | Hindered amine-based light stabilizer-3 | Part by weight |  |  |  |  |  |  |
|  | Other | Hindered amine-based light stabilizer-4 | Part by weight |  |  |  | 0.3 |  |  |
|  | E3 | Ultraviolet absorber | Part by weight |  |  | 0.3 | 0.3 | 0.3 | 0.3 |
|  | F | Amino-substituted triazine compound | Part by weight |  |  |  |  |  |  |
| Evaluation |  | Amount of formaldehyde Generation (On the basis of Comp. Ex. 61) | — | 1 | 1.0 | 1.1 | 1.9 | 4.5 | 0.06 |
|  |  | Crack generation time | Hour | 100 | 150 | 100 | 950 | 1000 | 950 |
|  |  | Mold-polluting property | — | ○ | ○ | ○ | ○ | ○ | X |
|  |  | Tensile strength | MPa | 65 | 65 | 65 | 65 | 65 | 58 |

|  |  |  |  | Comparative Example 67 | Comparative Example 68 | Comparative Example 69 | Comparative Example 70 | Comparative Example 71 |
|---|---|---|---|---|---|---|---|---|
| COMPOSITION | A | Polyacetal resin | Part by weight | 100 | 100 | 100 | 100 | 100 |
|  | B | Inorganic pigment-1 | Part by weight | 0.5 | 0.5 | 0.5 |  |  |
|  |  | Inorganic pigment-3 | Part by weight | 0.1 | 0.1 | 0.1 |  |  |
|  |  | Organic pigment-1 | Part by weight |  |  |  | 0.4 |  |
|  |  | Organic pigment-2 | Part by weight |  |  |  |  | 0.3 |
|  | C2 | Polyetheresteramide compound-1 | Part by weight | 0.3 |  |  |  |  |
|  |  | Polyetheresteramide compound-2 | Part by weight |  |  |  | 0.3 |  |
|  | D | Dihydrazide compound-1 | Part by weight |  |  |  | 0.1 | 0.1 |
|  |  | Dihydrazide compound-2 | Part by weight |  |  |  |  |  |
|  | Other | Dihydrazide compound-3 | Part by weight |  | 0.1 | 0.1 |  |  |
|  | E1 | Sterically hindered phenolic compound-2 | Part by weight | 0.03 | 0.03 | 0.03 | 0.03 | 0.03 |
|  | E2 | Hindered amine-based light stabilizer-1 | Part by weight | 0.3 | 0.3 | 0.3 |  |  |
|  |  | Hindered amine-based light stabilizer-2 | Part by weight |  |  |  | 0.3 | 0.3 |
|  |  | Hindered amine-based light stabilizer-3 | Part by weight |  |  |  |  |  |
|  | Other | Hindered amine-based light stabilizer-4 | Part by weight |  |  |  |  |  |

TABLE 8-continued

| | | | | | | | | |
|---|---|---|---|---|---|---|---|---|
| | E3 | Ultraviolet absorber | Part by weight | 0.3 | 0.3 | 0.3 | 0.3 | 0.3 |
| | F | Amino-substituted triazine compound | Part by weight | | | | | |
| Evaluation | | Amount of formaldehyde Generation (On the basis of Comp. Ex. 61) | — | 3.9 | 1.6 | 0.9 | 0.85 | 0.8 |
| | | Crack generation time | Hour | 1000 | 900 | 900 | 800 | 800 |
| | | Mold-polluting property | — | ○ | ○ | ○ | ○ | ○ |
| | | Tensile strength | MPa | 63 | 65 | 63 | 65 | 65 |

As is clear from Tables 7 and 8, it is shown that the polyacetal resin composition of the invention is an excellent one, such that it exerts simultaneously the effect of suppressing the formaldehyde generation, the effect of improving the weather resistance, the effect of suppressing the mold pollution, and the effect of suppressing the mechanical strength deterioration, in spite of the coloring with pigment. On the other hand, in Comparative Examples 61 to 65, 68, 70 and 71 containing no polyetheresteramide resin of the invention, the amount of formaldehyde generation is large, and in Comparative Example 66 containing an increased content of a dihydrazide compound without the incorporation of the polyetheresteramide resin, the amount of formaldehyde generation is reduced, but the mold pollution is remarkable and in addition, the tensile strength deteriorates. Comparative Examples 65 and 67 containing no dihydrazide compound of the invention, and Comparative Examples 68 and 69 containing aliphatic dihydrazide (dihydrazide compound-3) having a large water solubility show a large amount of formaldehyde generation. Comparative Examples 61 and 62 containing no ultraviolet absorber show a short crack generation time, and thus poor weather resistance.

In Examples 61 to 73, relative to 100 parts by weight of the polyacetal resin, when the addition amount of the colorant is less than 0.01 parts by weight, the coloring effect remarkably deteriorates, and when it is more than 5 parts by weight, the effect of suppressing the formaldehyde generation remarkably deteriorates. Moreover, in Examples 61 to 73, relative to 100 parts by weight of the polyacetal resin, when the addition amount of the polyetheresteramide resin satisfying the condition of the invention is less than 0.01 parts by weight, the effect of suppressing the formaldehyde generation remarkably deteriorates, and when it is more than 3 parts by weight, the mechanical strength of molded articles remarkably deteriorates. Further, in Examples 61 to 73, relative to 100 parts by weight of the polyacetal resin, when the addition amount of the dihydrazide compound satisfying the condition of the invention is less than 0.01 parts by weight, the effect of suppressing the formaldehyde generation remarkably deteriorates, and when it is more than 1 part by weight, the effect of suppressing the mold pollution remarkably deteriorates. Furthermore, in Examples 61 to 73, relative to 100 parts by weight of the polyacetal resin, when the addition amount of the hindered amine-based light stabilizer is less than 0.01 parts by weight, the weather resistance remarkably deteriorates, and when it is more than 5 parts by weight, the mechanical property remarkably deteriorates and in addition, the mold pollution increases. Furthermore, in Examples 61 to 73, relative to 100 parts by weight of the polyacetal resin, when the addition amount of the ultraviolet absorber is less than 0.01 parts by weight, the weather resistance remarkably deteriorates, and when it is more than 5 parts by weight, the mechanical property remarkably deteriorates. The polyacetal resin composition of the invention can satisfy all of the effect of coloring, effect of suppressing the formaldehyde generation, effect of improving the weather resistance, effect of suppressing the mold pollution, and effect of suppressing the mechanical strength deterioration, by controlling the addition amount of respective components within specified ranges relative to the polyacetal resin, respectively.

The invention claimed is:
1. A polyacetal resin composition comprising:
(A) 100 parts by weight of a polyacetal resin,
(B) 0.01 to 5 parts by weight of a colorant selected from inorganic and organic pigments,
(C) 0.01 to 3 parts by weight of (C1) below, or 0.01 to 3 parts by weight of (C2) below,
(C1) a polyamide resin provided with at least one of such physical properties that the melting point or softening point is 180° C. or less, and the amine value is 2 mgKOH/g or more,
(C2) a polyetheresteramide resin,
(D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and
(E) 0.01 to 1 part by weight of (E1) below, or a combination of 0.01 to 5 parts by weight of (E2) below and 0.01 to 5 parts by weight of (E3) below,
(E1) a sterically hindered phenolic compound,
(E2) a hindered amine-based light stabilizer having a structure represented by Formula (1) below, and
(E3) an ultraviolet absorber,

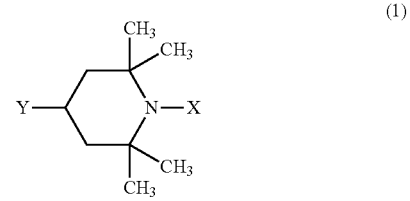

wherein X represents an organic group having a carbon atom at the bonding portion with the nitrogen atom, and Y represents an organic group that is bonded with a piperidyl group via an oxygen atom or a nitrogen atom, or a hydrogen atom;
wherein the polyamide resin (C1) is dimer acid polyamide resin; and
wherein the amide portion of the polyetheresteramide resin (C2) is dimer acid polyamide resin.

2. The polyacetal resin composition according to claim 1, comprising the polyamide resin (C1) provided with at least one of such physical properties that the melting point or softening point is 180° C. or less, and the amine value is 2 mgKOH/g or more, and the sterically hindered phenolic compound (E1).

3. The polyacetal resin composition according to claim 1, comprising the polyamide resin (C1) provided with at least one of such physical properties that the melting point or softening point is 180° C. or less, and the amine value is 2 mgKOH/g or more, the hindered amine-based light stabilizer (E2) having a structure represented by the above-mentioned Formula (1), and the ultraviolet absorber (E3).

4. The polyacetal resin composition according to claim 1, comprising the polyetheresteramide resin (C2), and the sterically hindered phenolic compound (E1).

5. The polyacetal resin composition according to claim 1, comprising the polyetheresteramide resin (C2), the hindered amine-based light stabilizer (E2) having a structure represented by the above-mentioned Formula (1), and the ultraviolet absorber (E3).

6. The polyacetal resin composition according to claim 1, wherein the polyamide resin (C1) is a polyamide resin having a melting point or a softening point of 180° C. or less.

7. The polyacetal resin composition according to claim 1, wherein the polyamide resin (C1) has a melting point or a softening point of 180° C. or less, and an amine value of 2 mgKOH/g or more.

8. The polyacetal resin composition according to claim 1, wherein the ether portion of the polyetheresteramide resin (C2) is polyoxyethylene glycol.

9. The polyacetal resin composition according to claim 1, wherein the colorant (B) is one selected from the group consisting of titanium yellow, titanium white, perinone-based pigment, phthalocyanine-based pigment and carbon black.

10. The polyacetal resin composition according to claim 1, wherein the dihydrazide compound (D) is one selected from the group consisting of naphthalenedicarboxylic acid dihydrazide, terephthalic acid dihydrazide, isophthalic acid dihydrazide, sebacic acid dihydrazide and dodecane diacid dihydrazide.

11. The polyacetal resin composition according to claim 1, further comprising 0.01 to 10 parts by weight of an amino-substituted triazine compound (F), relative to 100 parts by weight of the polyacetal resin (A).

12. The polyacetal resin composition according to claim 1, having a tensile strength of 60 MPa or more.

13. A polyacetal resin molded article formed by molding the polyacetal resin composition of claim 1.

14. A method of improvement of a polyacetal resin raw material composition comprising mixing, in a polyacetal resin raw material composition comprising (A) 100 parts by weight of a polyacetal resin, the following components:
   (B) 0.01 to 5 parts by weight of a colorant selected from inorganic and organic pigments,
   (C) 0.01 to 3 parts by weight of (C1) below, or 0.01 to 3 parts by weight of (C2) below,
      (C1) a polyamide resin provided with at least one of such physical properties that the melting point or softening point is 180° C. or less, and the amine value is 2 mgKOH/g or more,
      (C2) a polyetheresteramide resin,
   (D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and
   (E) 0.01 to 1 part by weight of (E1) below, or a combination of 0.01 to 5 parts by weight of (E2) below and 0.01 to 5 parts by weight of (E3) below,
      (E1) a sterically hindered phenolic compound,
      (E2) a hindered amine-based light stabilizer having a structure represented by Formula (1) below, and
      (E3) an ultraviolet absorber,

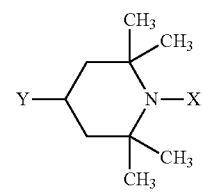

wherein X represents an organic group having a carbon atom at the bonding portion with the nitrogen atom, and Y represents an organic group that is bonded with a piperidyl group via an oxygen atom or a nitrogen atom, or a hydrogen atom;
   wherein the polyamide resin (C1) is dimer acid polyamide resin; and
   wherein the amide portion of the polyetheresteramide resin (C2) is dimer acid polyamide resin.

15. The method of improvement according to claim 14, suppressing tensile strength deterioration and formaldehyde generation.

16. An improving agent for a polyacetal resin raw material composition comprising:
   (B) 0.01 to 5 parts by weight of a colorant selected from inorganic and organic pigments,
   (C) 0.01 to 3 parts by weight of (C1) below, or 0.01 to 3 parts by weight of (C2) below,
      (C1) a polyamide resin provided with at least one of such physical properties that the melting point or softening point is 180° C. or less, and the amine value is 2 mgKOH/g or more,
      (C2) a polyetheresteramide resin,
   (D) 0.01 to 1 part by weight of a dihydrazide compound selected from the group consisting of aromatic dihydrazide compounds, and aliphatic dihydrazide compounds having a solubility of less than 1 g relative to 100 g of water at 20° C., and
   (E) 0.01 to 1 part by weight of (E1) below, or a combination of 0.01 to 5 parts by weight of (E2) below and 0.01 to 5 parts by weight of (E3) below,
      (E1) a sterically hindered phenolic compound,
      (E2) a hindered amine-based light stabilizer having a structure represented by Formula (1) below, and
      (E3) an ultraviolet absorber,

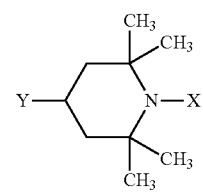

wherein X represents an organic group having a carbon atom at the bonding portion with the nitrogen atom, and Y represents an organic group that is bonded with a piperidyl group via an oxygen atom or a nitrogen atom, or a hydrogen atom;
   wherein the polyamide resin (C1) is dimer acid polyamide resin; and
   wherein the amide portion of the polyetheresteramide resin (C2) is dimer acid polyamide resin.

17. The improving agent for a polyacetal resin raw material composition according to claim 16, suppressing tensile strength deterioration and formaldehyde generation.

18. The polyacetal resin composition according to claim 1, wherein the (C) component is the polyamide resin (C1);
wherein the polyamide resin (C1) is dimer acid polyamide resin.

19. The polyacetal resin composition according to claim 1, wherein, in the hindered amine-based light stabilizer (E2), X in the Formula (1) is a group selected from alkyl groups having 1 to 10 carbon atoms, and groups represented by Formula (2) or (3) below:

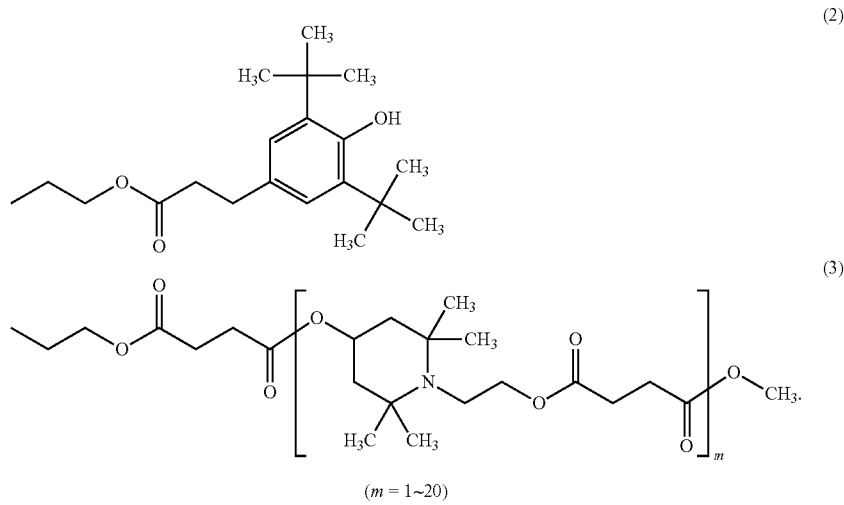

20. The polyacetal resin composition according to claim 1, wherein the hindered amine-based light stabilizer (E2) is at least one selected from compounds represented by Formulae (4) to (12) below:

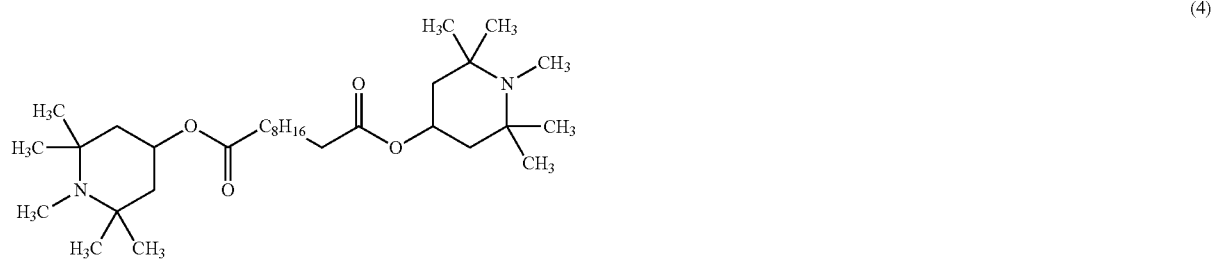

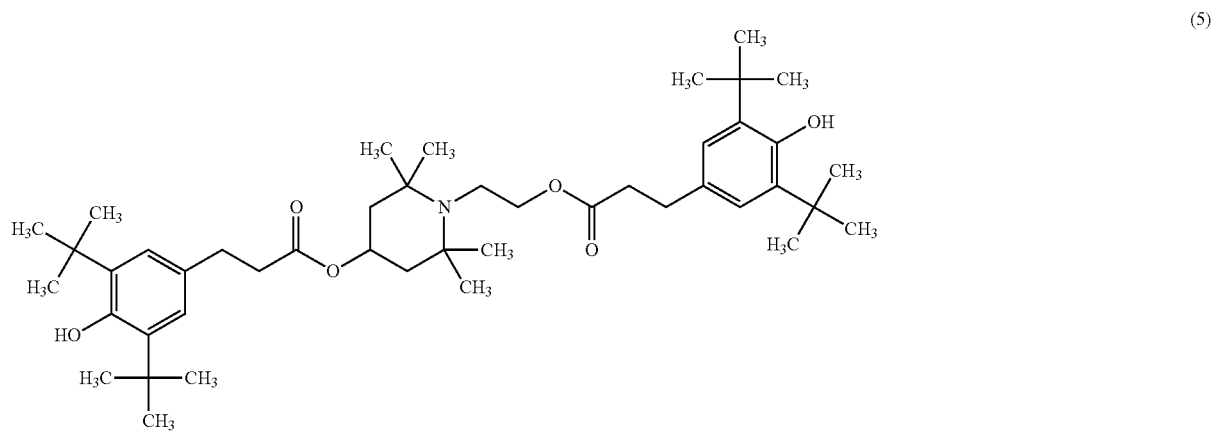

-continued
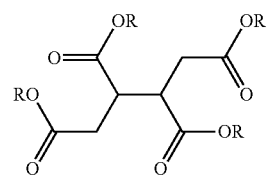 (6)
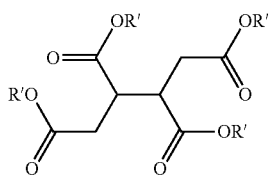 (7)
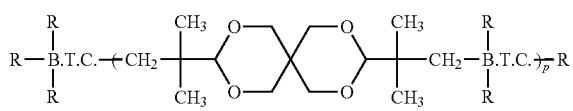 (8)
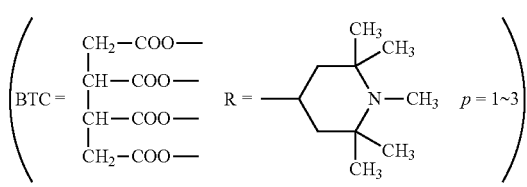
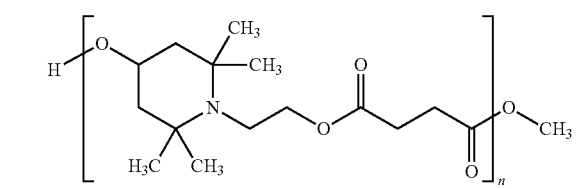 (9)
($n = 10\sim14$)
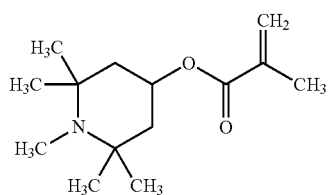 (10)
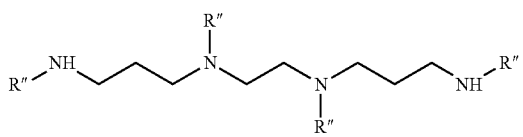 (11)
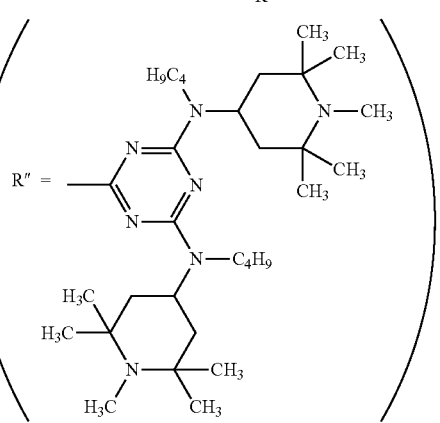

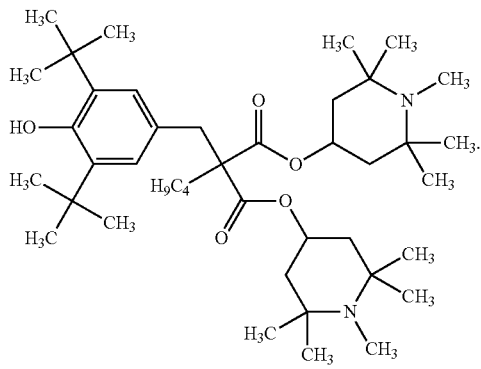
(12)

21. The polyacetal resin composition according to claim 1, wherein the ultraviolet absorber (E3) is a benzotriazole-based compound.

22. The polyacetal resin composition according to claim 1, wherein the ultraviolet absorber (E3) has a vapor pressure of $1 \times 10^{-8}$ Pa or less at 20° C.

23. The polyacetal resin composition according to claim 1, wherein the ultraviolet absorber (E3) is 2-(2H-benzotriazol-2-yl)-4,6-bis(1-methyl-1-phenylethyl)phenol or 2,2'-methylenebis[6-(2H-benzotriazol-2-yl)-4-(1,1,3,3-tetramethylbutyl)phenol].

24. The method of improvement according to claim 14, comprising adding the sterically hindered phenolic compound (E1).

25. The method of improvement according to claim 14, comprising adding the hindered amine-based light stabilizer (E2) having a structure represented by Formula (1), and the ultraviolet absorber (E3), thereby improving the weather resistance.

26. The improving agent for a polyacetal resin raw material composition according to claim 16, comprising the sterically hindered phenolic compound (E1).

27. The improving agent for a polyacetal resin raw material composition according to claim 16, comprising the hindered amine-based light stabilizer (E2) having a structure represented by the Formula (1), and the ultraviolet absorber (E3), thereby improving the weather resistance.

28. The polyacetal resin composition according to claim 1, wherein the (E) component is the sterically hindered phenolic compound (E1).

* * * * *